Sept. 1, 1964 E. C. WALKER, JR., ETAL 3,147,061

SUBSCRIBER COMMUNICATION RECEIVER

Filed Jan. 30, 1962 11 Sheets-Sheet 1

INVENTORS
Emil C. Walker, Jr.
Herbert G. Zapfe
BY James E. Tracy
ATTORNEY

INVENTORS
Emil C. Walker, Jr.
Herbert G. Zapfe
BY James E. Tracy
ATTORNEY

Sept. 1, 1964 E. C. WALKER, JR., ETAL 3,147,061

SUBSCRIBER COMMUNICATION RECEIVER

Filed Jan. 30, 1962 11 Sheets-Sheet 3

INVENTORS
Emil C. Walker, Jr.
Herbert G. Zapfe
BY James E. Tracy
ATTORNEY

Sept. 1, 1964 E. C. WALKER, JR., ETAL 3,147,061

SUBSCRIBER COMMUNICATION RECEIVER

Filed Jan. 30, 1962 11 Sheets-Sheet 4

INVENTORS
Emil C. Walker, Jr.
Herbert G. Zapfe

BY James E. Tracy
ATTORNEY

INVENTORS
Emil C. Walker Jr.
Herbert G. Zapfe
BY James E. Tracy
ATTORNEY

INVENTORS
Emil C. Walker, Jr.
Herbert G. Zapfe
BY James E. Tracy
ATTORNEY

FIG. 12
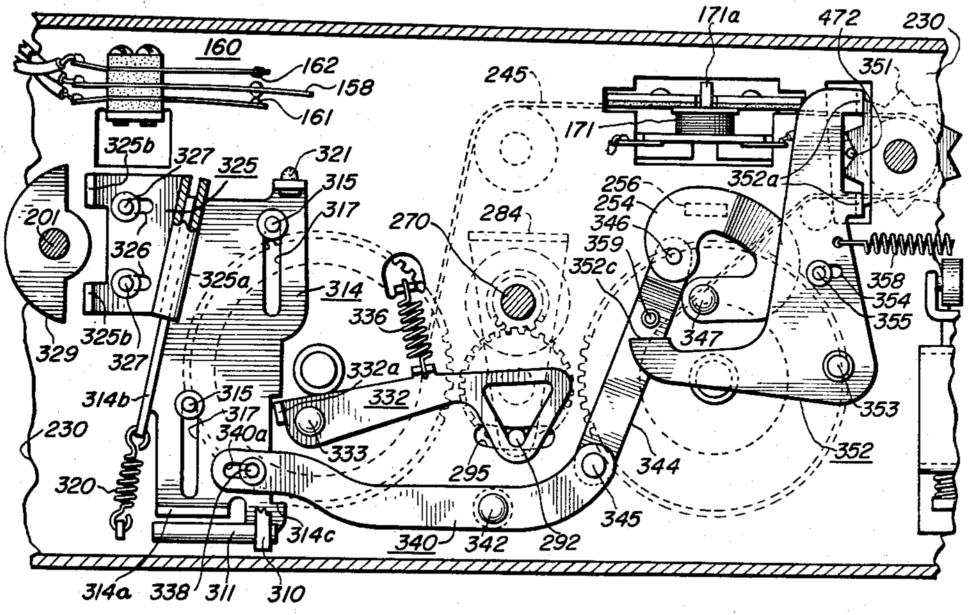
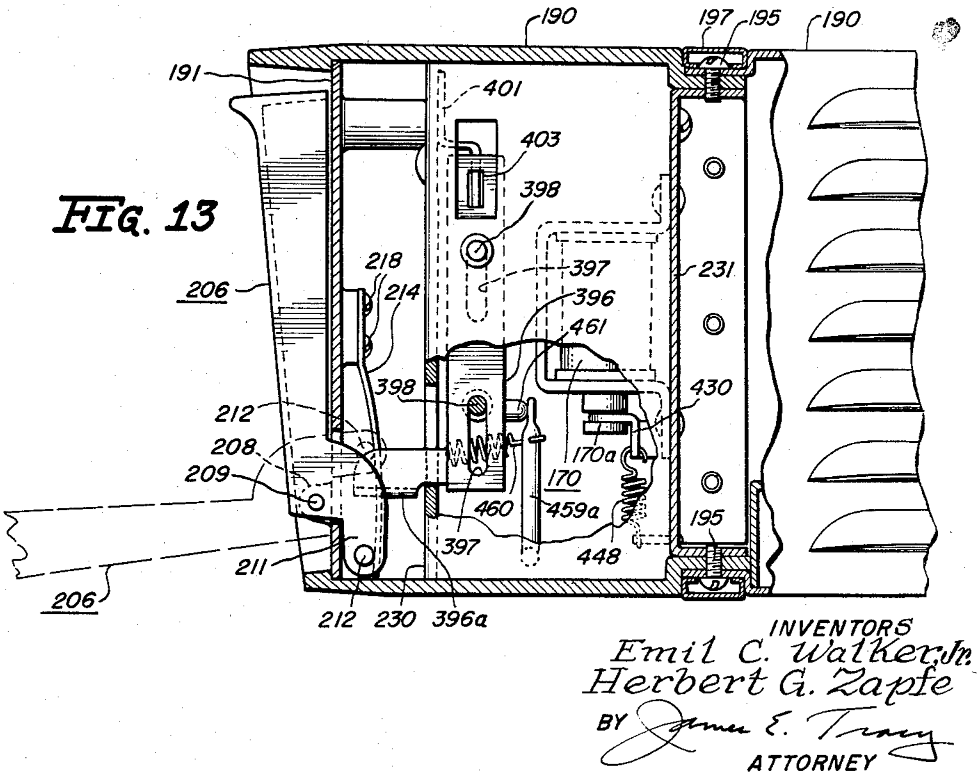
INVENTORS
Emil C. Walker, Jr.
Herbert G. Zapfe
BY James E. Tracy
ATTORNEY INVENTORS
Emil C. Walker Jr.
Herbert G. Zapfe
BY James E. Tracy
ATTORNEY

SUBSCRIBER COMMUNICATION RECEIVER

Filed Jan. 30, 1962

INVENTORS
Emil C. Walker, Jr.
Herbert G. Zapfe
BY James E. Tracy
ATTORNEY

INVENTORS
Emil C. Walker Jr.
Herbert G. Zapfe
BY James E. Tracy
ATTORNEY

INVENTORS
Emil C. Walker Jr.
Herbert G. Zapfe
BY James E. Tracy
ATTORNEY

United States Patent Office 3,147,061

Patented Sept. 1, 1964

3,147,061

SUBSCRIBER COMMUNICATION RECEIVER

Emil C. Walker, Jr., Woodstock, and Herbert G. Zapfe, Cary, Ill., assignors to Zenith Radio Corporation, Chicago, Ill., a corporation of Delaware Filed Jan. 30, 1962, Ser. No. 169,889
6 Claims. (Cl. 346—24)

This invention relates to a subscriber communication receiver of the type in which code-determining apparatus must be adjusted in accordance with a given adjustment before a received intelligence signal may be intelligibly reproduced. More particularly, it pertains to a charge recording arrangement for such a receiver. The invention is especially attractive when incorporated in a subscription television receiver for receiving a television signal in coded form, and will be described in such an environment.

Accordingly, it is an object of the present invention to provide a new subscriber communication receiver.

It is another object of the invention to provide a novel charging register for a subscriber communication receiver.

It is a further object of the invention to provide a novel charging arrangement for recording different charges for different programs in a subscriber communication receiver.

A subscriber communication receiver for utilizing a received intelligence signal, constructed in accordance with one aspect of the invention, comprises code-determining apparatus which must be adjusted by the subscriber in accordance with a given adjustment for a specified program before the intelligence signal may be intelligibly reproduced. Means are provided for deriving a comparison signal from the code-determining apparatus having a characteristic determined, at least in part, by the instantaneous adjustment of the code-determining apparatus. There are correlation testing means which respond to the comparison signal for effectively comparing the instantaneous adjustment of the code-determining apparatus with the given adjustment to derive a control effect only if the code-determining apparatus has in fact been properly positioned to the given adjustment. There is a printing mechanism, and billing tape on which charge information is to be recorded. A portion of the tape is presented to the printing mechanism. Means are provided for changing the portion of the billing tape which is presented to the printing mechanism. Finally, the receiver includes means, including the printing mechanism, coupled to the correlation testing means and responsive to the control effect for recording a charge for the specified program on that portion of the billing tape instantaneously presented to the printing mechanism.

Figure 1:
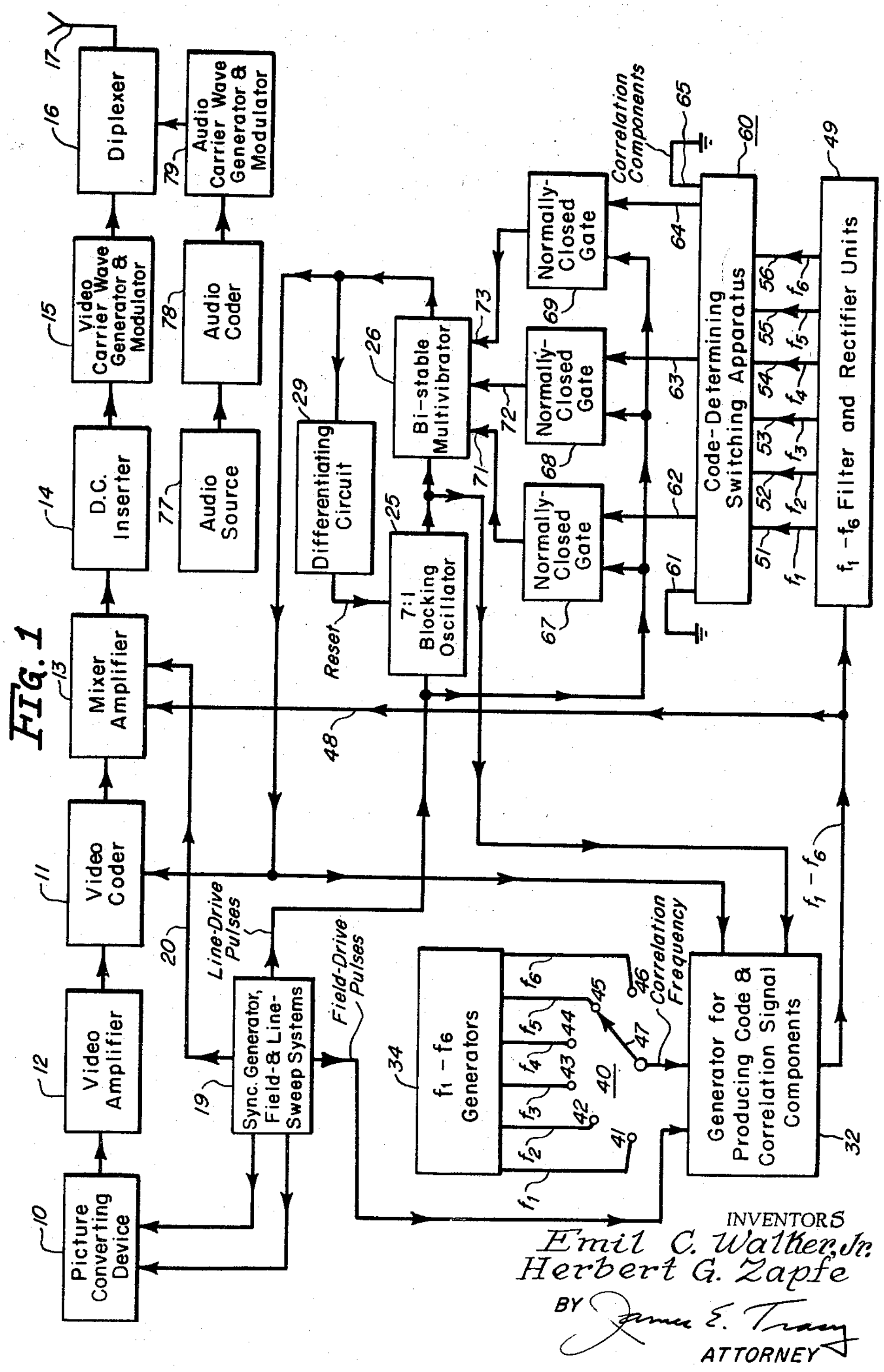
Figure 2:
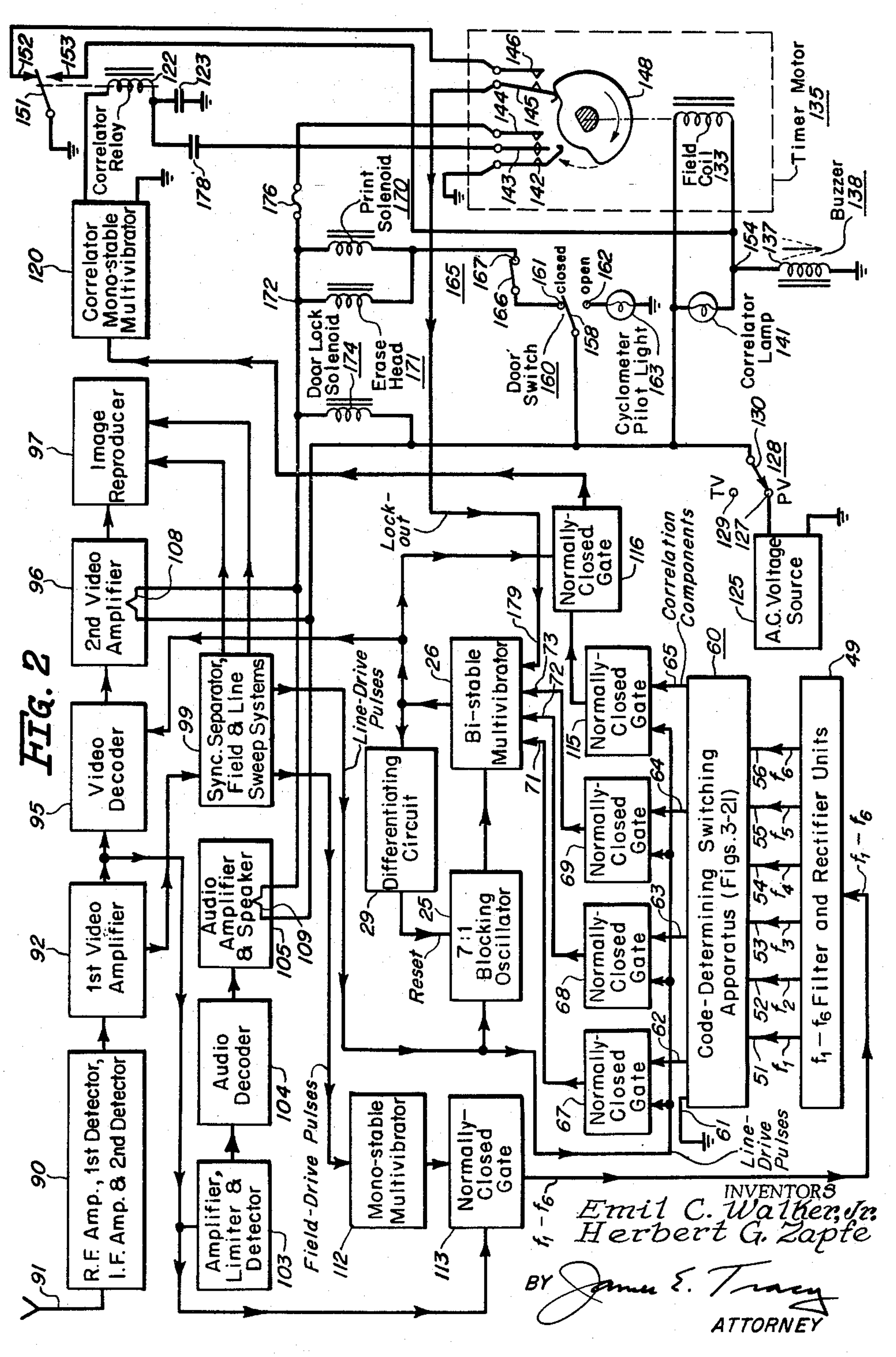

The features of this invention which are believed to be new are set forth with particularity in the appended claims. The invention, together with further objects and advantages thereof, may best be understood, however, by reference to the following description in conjunction with the accompanying drawings in which:

FIGURE 1 is a block diagram of a communication transmitter, specifically a subscription television transmitter;

FIGURE 2 schematically illustrates a communication receiver, specifically a subscription television receiver, constructed in accordance with one embodiment of the invention and arranged to utilize the signal transmitted from the transmitter of FIGURE 1; and FIGURES 3–21 are various views of portions of the receiver of FIGURE 2.

Before turning to a description of FIGURE 1, it should be understood that many of the circuits shown therein, and also in FIGURE 2, in block diagram form are illustrated and described in greater detail in copending application Serial No. 26,545, filed May 3, 1960, and issued March 12, 1963 as Patent 3,081,377, in the name of Norman T. Watters, and in several other patent applications and patents referred to in the Watters case. The expedient of block diagram illustration has been employed in the interest of simplification and in order to pinpoint clearly the invention.

*Transmitter Circuitry*

Considering now the structure of the transmitter of FIGURE 1, a picture converting device 10 is provided which may take the form of a conventional camera tube for developing a video signal representing an image to be televised. A video coding device 11 is connected to the output terminals of camera tube 10 through a video amplifier 12. Coder 11 includes a beam-deflection switch tube having a pair of target anodes to one of which is coupled a delay line. In response to a control signal applied to its deflection electrodes, the switch tube selectively interposes the delay line in the video channel as the electron beam in the tube is deflected from one to the other of the two anodes, thereby to change the time relation of video to synchronizing information and to establish two different operating modes. Intermittently varying the relative timing of the video and synchronizing signals effectively codes the television signal since ordinary television receivers, not containing suitable decoding apparatus, require a television signal having a constant time relation of video and synchronizing components; if such is not the case, intelligible image reproduction is impossible.

The output of coder 11 is coupled to one pair of input terminals of a mixer amplifier 13, which in turn is connected through a direct current inserter 14 to a video carrier wave generator and modulator 15 having output terminals connected through a diplexer 16 to a transmitting antenna 17. A synchronizing signal generator supplies field- and line-drive pulses to a field-sweep system and to a line-sweep system, respectively. For convenience, the synchronizing signal generator, and field- and line-sweep systems have been shown by a single block designated by the numeral 19. The output terminals of the sweep systems are connected to the field- and line-deflection elements (not shown) associated with picture converting device 10. The synchronizing signal generator of unit 19 supplies the usual field- and line-synchronizing components and associated pedestal components to mixer amplifier 13 over suitable circuit connections, here schematically illustrated as a single conductor 20.

The synchronizing signal generator additionally supplies line-drive pulses to one input of a conventional 7:1 step-down blocking oscillator 25 which has its output terminals connected to the input circuit of a multi-condition control mechanism in the form of a bi-stable multivibrator 26. Specifically, the output of blocking oscillator 25 is connected to the "common" or "counting" input circuit of bi-stable multivibrator 26. The multivibrator may be of conventional construction, including the usual pair of cross-coupled triodes or transistors rendered conductive in alternation as the multivibrator is triggered between its two stable operating conditions. Blocking oscillator 25 is coupled to both of the triodes or transistors, whichever the case may be, by way of the common or counting input so that the multivibrator is always triggered from its instantaneous condition, whatever one that may be, to its opposite condition in response to successive pulses applied from the oscillator. The output terminals of multivibrator 26 connect to the deflection electrodes of video coder 11. The cascade arrangement of blocking oscillator 25 and multivibrator 26 executes a series of fourteen operating steps in completing each cycle and realizes a total count-down ratio of 14:1. Thus, the control signal from multivibrator 26 exhibits a rectangular waveshape having the amplitude changes every seven line traces. This effects actuation of video coder 11 between its two operating conditions and interposes the time-delay network in the video channel during alternate groups of seven successive line-trace intervals to introduce a time delay between the radiated video and synchronizing components. Since the waveform of the control signal from unit 26 determines when mode changes are made and also in what mode the system is established when a change is made, that waveform represents the code schedule or mode changing pattern of the system.

To reset blocking oscillator 25 to its reference or zero-count operating step, a feedback circuit, including a differentiating circuit 29, is provided from the output of multivibrator 26 to the reset input of the oscillator. The amplitude excursions of the output signal from multivibrator 26 determine when oscillator 25 is reset.

In order to interrupt the periodic, cyclic actuation of the counting chain 25, 26, random code signal generating apparatus, shown by a single block 32 is provided for developing, during a portion of each field-retrace interval, a combination or group of code signal components or bursts individually having a predetermined identifying characteristic, such as frequency, and collectively representing coding information in accordance with their appearance and order within the combination. Attention is directed to the copending Watters application, Serial No. 26,545, and references mentioned therein, for the details of the code signal generating apparatus included in unit 32. The code signal combination produced during each field-retrace interval may comprise a series of up to ten code signal bursts, each of which may have any one of five different frequencies selected from a group of six frequencies designated $f_1$–$f_6$, and these bursts are preferably randomly sequenced and randomly appearing within the overall code burst interval. The sixth frequency of the group $f_1$–$f_6$, which is not used as a code signal frequency, is devoted to correlation testing purposes as will be explained. To provide the correlation signal components, a series of generators, schematically shown by a single block 34, has a series of six output terminals, labeled $f_1$–$f_6$, each of which delivers a continuous sinusoidal signal of an assigned, respective one of frequencies $f_1$–$f_6$. The $f_1$–$f_6$ output terminals of unit 34 are respectively connected to a series of six stationary switch contacts 41–46 of a simple six-position rotary switch 40. The rotary switch contact 47 of switch 40 is connected to the signal generating apparatus of unit 32.

With this arrangement, a single frequency selected from the group $f_1$–$f_6$ is employed for correlation testing purposes and it is contemplated that this correlation frequency may be changed from program to program. The frequencies of the group $f_1$–$f_6$, with the exclusion of the correlation frequency, are then employed for coding purposes. Suitable and simple adjustments of the apparatus of block 32 may be made by the operator of the subscription television transmitter in order that the frequency devoted to correlation testing for a given program is not used for coding. For example, in the illustrative setting of switch 40 in FIGURE 1, frequency $f_5$ has been selected for correlation testing. Accordingly, the code signal generating apparatus of block 32 will be adjusted by the operator so that only the five frequencies $f_1$–$f_4$ and $f_6$ are devoted to scrambling.

The output terminals of unit 32, which provide combinations of code and correlation signal components collectively exhibiting frequencies $f_1$–$f_6$, are connected to another input of mixer amplifier 13 by way of conductor 48 to facilitate their conveyance to subscriber receivers. The output terminals of unit 32 are also connected to a series of six filter and rectifier units, conveniently shown in FIGURE 1 by a single block 49, respectively selective to assigned ones of the different frequencies $f_1$–$f_6$ to facilitate separation of the code and correlation signal components from one another. The six outputs of the filter and rectifier units, each of which produces rectified pulses of one of frequencies $f_1$–$f_6$ as indicated in the drawing, are connected to a series of six input circuits or conductors 51–56, respectively, of an adjustable code-determining switching apparatus 60 having a series of five output circuits or conductors 61–65. The input and output circuits of adjustable switching apparatus 60 may be considered code-determining circuits between which mechanism 60 establishes different prescribed ones of a multiplicity of different inter-connection patterns. This may be achieved by a family of switches, the adjustment of which selects the desired permutation pattern between inputs and outputs for a given program interval. Preferably, apparatus 60 takes the form of that which is employed in the receiver, to be described. Thus, switching apparatus 60 preferably is of the construction shown in detail in FIGURES 3–21, to be described hereinafter. Suffice it to say at this point that apparatus 60 has a manual control knob and a display window behind which is a cyclometer register. The permutation pattern between input conductors 51–56 and output conductors 61–65 may be changed simply by rotating the control knob. Indicia, in the form of a combination of three numbers and one letter, is displayed within the window and represents the permutation pattern which instantaneously exists between the input and output circuits of switching apparatus 60.

Adjustable switching apparatus 60 is provided to permute applied code signal components between its input and output circuits in order that the code bursts developed in unit 32 may be further coded before they are used for coding the video signal. It is contemplated that the switching arrangement will be adjusted differently for each program for which a charge is to be assessed and, if desirable, the arrangement of the code-determining apparatus installed at each receiver within a given service area will require a different setting for any selected program in order that each subscriber must obtain different switch setting data for each program.

Output circuits 61 and 65 of switching apparatus 60 are connected to ground or "thrown away." Apparatus 60 is so adjusted for any given program that the correlation frequency component is routed therethrough to output conductor 65 and thrown away. This is done because the correlation component is only required at the receiver, as will be explained, and is not needed in the operation of the transmitter.

The other three output conductors 62–64 of switching mechanism 60 are connected to respective ones of a series of three normally-closed or normally-blocked gate circuits 67–69 which are supplied with line-drive pulses from the synchronizing signal generator of unit 19. The output circuits of gates 67–69 are connected to input circuits 71–73, respectively, of bi-stable multivibrator 26. Input circuit 72 is preferably coupled to the common or counting input of multivibrator 26 so that each time a pulse is translated thereover, multivibrator 26 is triggered from its instantaneous condition, whichever one that may be, to its opposite condition in the same manner as if it had been supplied with a pulse from blocking oscillator 25. Input circuit 71 is preferably connected to one of the reset inputs of multivibrator 26 and in response to each pulse applied thereover establishes the multivibrator in a predetermined one of its operating conditions if it is not already there. Input 73, on the other hand, is preferably connected to the other reset input of the multivibrator in order to trigger the multivibrator to the other of its stable operating conditions, if it is not already in that other condition, in response to pulses applied over that input.

Circuitry identical to units 25–29 and 49–73 is found in the receiver of FIGURE 2 and in order to maintain precise synchronism of operation between such corresponding circuitry, it is essential that code-determining switching apparatus 60 at the receiver be positioned identically to the companion switching apparatus in the transmitter of FIGURE 1. To test for correlation, namely to effectively compare the switch setting pattern at the receiver with respect to that at the transmitter, it is necessary that the timing of the correlation signal components be tied in or related to the code schedule of the coded video signal, namely the schedule as represented by the amplitude excursions of the control signal developed in the output of multivibrator 26. As fully explained in the copending Watters case, Serial No. 26,545, the apparatus in unit 32 controls the timing or occurrence of the correlation signal components in order to facilitate correlation testing in the receiver. In order to correlate the timing of the correlation components with the code schedule, connections are required from the outputs of multivibrator 26 and blocking oscillator 25 to separate input circuits of the apparatus of unit 32. In addition, a connection is required from the sync generator of unit 19 to another input of unit 32 in order to supply field-drive pulses thereto. These three connections are all shown in FIGURE 1. With this arrangement and as will be explained, a single correlation signal component is produced and conveyed to subscriber receivers during each field-retrace interval. It is timed to occur during an interval in which multivibrator 26 is established in a predetermined one of its two conditions.

The audio signal portion of the telecast is provided by audio source 77 which may constitute a conventional microphone and audio amplifier. The output of audio source 77 is coupled through an audio coder 78 to the input of an audio carrier wave generator and modulator 79, the output circuit of which is coupled to another input of diplexer 16. Audio coder 78 may take any one of a multiplicity of different forms; the only requirement is that it successfully scramble the audio intelligence. Coder 78 may, for example, be simply a frequency shift type of coder in which heterodyning techniques are employed to shift the audio information, with an inverted frequency distribution, to a portion of the frequency spectrum where it does not normally reside. Preferably, the audio signal is shifted to a higher portion of the frequency spectrum. Such an audio scrambling function is adequate since it effectively codes a characteristic of the audio signal inasmuch as a normal television receiver would not contain suitable compensating circuitry for re-inverting and reshifting the audio signal components frequency-wise.

*Transmitter Operation*

Considering now the operation of the transmitter of FIGURE 1, picture converting device 10 develops a video signal representing the picture information to be televised and, after amplification in amplifier 12, the video signal is translated through video coder 11 to mixer amplifier 13 wherein it is combined with the customary field- and line-synchronizing and blanking pulses from the synchronizing signal generator of unit 19. Mixer 13 thereby develops a composite video signal which is applied through direct current inserter 14 to video carrier wave generator and modulator 15 wherein it is amplitude modulated on a picture carrier for application through diplexer 16 to antenna 17 from which it is radiated to subscriber receivers. The field- and line-sweep systems are synchronized by the field- and line-drive pulses from the sync generator of unit 19 in conventional manner.

Audio source 77 meanwhile picks up the sound information accompanying the telecast, amplifies and supplies it to audio coder 78 wherein the audio components are shifted in the frequency spectrum, with an inverted frequency distribution, to occupy abnormal positions to achieve sound scrambling. The coded audio signal is frequency modulated on a sound carrier in unit 79, and the modulated sound carrier is supplied through diplexer 16 to antenna 17 for concurrent radiation to subscriber receivers with the video information.

Coding of the video portion of the telecast is achieved by coder 11 under the influence of the deflection-control signal developed from line-drive pulses by blocking oscillator 25 and multivibrator 26 for periodically switching the beam of the beam-deflection tube in coder 11 back and forth between its two collector anodes in accordance with the code schedule represented by the amplitude variations of the control signal, which occur every seven line traces because of the total 14:1 count down ratio of counting stages 25, 26.

In order to interrupt this periodic mode-changing pattern and increase the complexity of the code schedule, a combination of up to ten code signal components, individually exhibiting one of five different frequencies selected from the group $f_1$–$f_6$ (the sixth frequency in the group being devoted to correlation testing), is developed in source 32 during each field-retrace interval. The code signal bursts are separated from one another and rectified in filter and rectifier units 49 for individual application to the various input circuits 51–56 of switching apparatus 60. This apparatus may establish any one of a multitude of circuit connections between its input and output conductors so that rectified pulses are supplied, via output circuits 62–64, to normally-closed gate circuits 67–69 with a distribution depending on the instantaneous setting of mechanism 60. Of course, if switching apparatus 60 connects one or more of input conductors 51–56 to output circuit 61, the code signal components translated thereover are channeled directly to ground or "thrown away." Grounding output 61 increases the total number of available permutations between the input and output circuits of switching apparatus 60. The components exhibiting the frequency devoted to correlation testing are channeled to output conductor 65 which is connected to ground in order that such correlation signal components may be eliminated so far as video coding is concerned.

Gates 67–69 also receive line-drive pulses from the sync generator of unit 19 and gate in those of the line-drive pulses that occur in time coincidence with the rectified code signal components to input circuits 71–73 of multivibrator 26 to effect actuation thereof. Since the code signal components are preferably randomly sequenced, the cyclic actuation of the multivibrator, normally taking place in response to pulses from oscillator 25 only, is therefore interrupted. In order to add additional scrambling into the system, the control signal from multivibrator 26 is differentiated in differentiating circuit 29 and the differentiated pulses are fed back to oscillator 25 for resetting purposes. Because of the feedback arrangement, random actuation of control mechanism 26 results in random resetting of oscillator 25. Hence, upon the termination of each combination of code bursts, counting chain 25, 26 is established at a different one of its fourteen operating steps or phase conditions from that in which it would have been established if the periodic actuation had not been interrupted. The control signal developed in the output of multivibrator 26 therefore constitutes a rectangular shaped signal which is phase modulated during field-retrace intervals.

To very briefly summarize the operation of the transmitter of FIGURE 1, the code signal components developed in source 32 are permutably applied by way of adjustable switching apparatus 60 to a plurality of input circuits 71–73 of control mechanism 26 to develop a control signal having a code schedule (specifically wave shape) determined in part by the instantaneous setting of switching apparatus 60 and in part by the random characteristic of the code signal components.

In order that a subscriber may utilize the coded transmission, it is necessary that each combination of code signal components be made known to the subscriber receivers. To that end, the code signal components are applied to mixer amplifier 13 over conductor 48 to be combined with the composite video signal for transmission to the subscriber receivers. To facilitate correlation testing at each receiver, the signal generating apparatus of unit 32 produces correlation signal components of the frequency determined by the setting of rotary switch 40 and having a timing which is correlated or tied in with the amplitude excursions of the output signal of bi-stable multivibrator 26. Specifically, a single correlation signal burst is produced during each field-retrace interval and is timed to occur when control mechanism 26 is established in a predetermined one of its two conditions. These correlation signal components are also transmitted to the subscriber receivers via connection 48.

*Receiver Circuitry*

The subscriber receiver of FIGURE 2 is constructed in accordance with one embodiment of the invention to decode especially the coded television signal developed in the transmitter of FIGURE 1. A cascade arrangement of a radio frequency amplifier, a first detector or oscillator mixer, an intermediate frequency amplifier of one or more stages, and a second detector, all combined for convenience in FIGURE 2 in a single block or unit 90, has its input terminals connected to a receiving antenna 91 and its output terminals connected to a first video amplifier 92. The output of video amplifier 92 is coupled through a video decoder 95 to the input terminals of a second video amplifier 96 which in turn has output terminals connected to the input of an image-reproducing device or a picture tube 97. Decoding device 95 may be identical in construction to video coder 11 in the transmitter except that it is controlled to operate in complementary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 95 with no delay, whereas when no delay is introduced at the transmitter, a delay is imparted to the video signal in video decoder 95. First video amplifier 92 is also coupled to a synchronizing signal separator which is connected to the usual field-sweep system and line-sweep system connected in turn to the deflection elements (not shown) associated with picture tube 97. For convenience, the combination of the sync separator, and the field- and line-sweep systems have been shown by a single block 99.

Assuming that the illustrated receiver is of the intercarrier type, an intercarrier signal component is derived from first video amplifier 92 and is supplied to a unit 103 consisting of a conventional amplifier, amplitude limiter and discriminator detector. The output of unit 103 is coupled through a frequency shift audio decoder 104 to an audio amplifier and speaker, combined for illustrative purposes in a single unit 105. Audio decoder 104 may be similar to audio coder 78 in the transmitter except that it is effectively operated in complementary fashion in order to shift or return the scrambled audio information from the portion of the spectrum which it occupies, as transmitted, back to the original, appropriate location as required to accomplish audio unscrambling.

It is assumed that second video amplifier 96 and the audio amplifier portion of unit 105 each contain a vacuum tube. Filaments for those vacuum tubes, designated by the numerals 108, 109, are respectively shown in units 96, 105. The circuitry for applying heater voltage to those two filaments will be described hereinafter. Suffice it to say at this point that filaments 108 and 109 are not energized until after the correlation test procedure has been completed and it has been found that there is a correct condition of correlation between the setting of the code-determining switching apparatus at the receiver and that at the transmitter. With filaments 108 and 109 energized, intelligible reproduction of the video and audio signals is obtained.

To facilitate the separation of the code signal components from the composite television signal, a monostable multivibrator 112 is connected to the sync separator portion of unit 99 to receive field-drive pulses therefrom and the output of the multivibrator is coupled to one input of a normally-blocked gate circuit 113, another input of which is coupled to the output of first video amplifier 92 to receive the coded composite video signal. The output of gate 113 is connected to a series of filter and rectifier units, once again illustrated for convenience as a single block 49. The output of gate 113 provides both the code and correlation signal components; thus all of the frequencies $f_1$–$f_6$ are delivered to unit 49.

The arrangement of elements 25–64 and 67–73 in FIGURE 2 is identical with the correspondingly numbered units in the transmitter of FIGURE 1. The only difference is that while blocking oscillator 25 in the transmitter receives line-drive pulses from the synchronizing signal generator, oscillator 25 in the receiver of FIGURE 2 receives line-drive pulses from the line-sweep system of unit 99.

In order to achieve a test of correlation in accordance with the teachings of the copending Watters case, Serial No. 26,545, output conductor 65 of code-determining switching apparatus 60 in the receiver of FIGURE 2, rather than being connected to ground as in the transmitter, is connected to one input of a normally-closed gate circuit 115, another input of which is connected to the line-sweep system of unit 99 to receive line-drive pulses therefrom. The output of gate 115 is connected to one input of a comparison device in the form of a normally-closed gate 116, another input of which is connected to the output of bistable multivibrator or control mechanism 26. If the adjustment of code-determining switching apparatus 60 in the receiver agrees with that of switching apparatus 60 in the transmitter, the relationship between the output signal of multivibrator 26 and the correlation components developed at output conductor 65 will be the same at both the transmitter and receiver. Specifically, the timing of the correlation signal components is arranged at the transmitter so that one such component occurs during each field-retrace interval and at a time when control mechanism 26 is established in a prescribed condition such that its output signal exhibits an amplitude level of a polarity and magnitude sufficient to open gate 116 to gate-in the line-drive pulse, occurring in time coincidence with the correlation component, to the output of gate 116.

Since the wave shape of the output control signal of the multivibrator 26 is influenced by the instantaneous setting of the code-determining switching apparatus 60 in addition to the random nature of the code signal components applied over input circuits 71–73, the output signal may be considered a comparison signal having a characteristic determined, at least in part, by the instantaneous adjustment of the code-determining apparatus. Comparison device or gate 116 therefore constitutes means responsive to the comparison signal for effectively comparing the instantaneous adjustment of the code-determining apparatus with a given adjustment in accordance with which it should be adjusted to effect a series of correlation tests to determine if the code-determining apparatus has in fact been properly adjusted by the subscriber. The instants at which correlation tests are made are determined by the occurrence of the pulses at the output of gate 115. For a properly adjusted receiver, a pulse should be developed in the output of gate 116 during each field-retrace interval. When there is incorrect correlation, the waveform of the control signal from multivibrator 26 will not exhibit the required magnitude and polarity at the instants of the correlation components and pulses will not be developed in the output of gate 116 during each field-retrace interval.

The output terminals of gate 116 are connected to a correlator monostable or single trip multivibrator 120.

The single output pulse developed by gate 116 during each field-retrace interval, when correct correlation prevails, actuates correlator multivibrator 120 from its normal to its abnormal operating condition, in which it remains for an interval slightly less than a complete field-trace interval. With this arrangement, correlator multivibrator 120 automatically falls back to its normal or reset condition at some instant preceding each correlation test. Unit 120 could also, of course, take the form of a blocking oscillator which would reset itself after an interval of a predetermined duration. One output terminal of correlator multivibrator 120 is connected to ground and the other is connected to one terminal of a correlator relay 122, the other terminal of the relay being coupled to ground through a condenser 123.

The connection of relay 122 to multivibrator 120 is arranged so that the relay energizes when the multivibrator is triggered to its abnormal condition. Although, in a properly correlated receiver, multivibrator 120 falls back to its normal condition for a relatively short time interval immediately preceding each correlation test, the construction of relay 122 and the capacitance of condenser 123 introduce a time constant such that the relay does not become de-energized during that short time interval. Alternatively, the relay may be made to have a certain degree of inertia so that once energized it does not become de-energized until multivibrator 120 falls back to its normal condition and remains there for an interval substantially greater than the short interval in a properly correlated receiver.

An A.C. voltage source 125 is provided for producing an A.C. voltage of a magnitude suitable for, inter alia, energizing filaments 108 and 109. For example, if the tubes of the second video amplifier and audio amplifier are of the type requiring 6.3 volts filament voltage, source 125 will be a 6.3 volt source. One output terminal of source 125 is connected to ground while the other is connected to a fixed contact 127 of a simple two-position switch 128. Fixed contact 129 of the switch is isolated and unconnected. Contacts 127 and 129 are labeled "P.V." and "T.V.," respectively. Switch 128, which is called the PV-TV switch, is to be positioned by the subscriber. When positioned to the TV position, all of the circuitry in FIGURE 2 associated with decoding or unscrambling is de-energized and the receiver functions in the conventional manner of any non-subscription receiver. On the other hand, when switch 128 is positioned to the PV position, circuitry (not shown) is completed to energize all of the decoding apparatus. The indicia "PV" is a shorthand designation of the assignee's "Phonevision" subscription television system.

Movable contact 130 of switch 128 is connected to one terminal of the field coil 133 of a timer motor assembly or timing mechanism 135, the other terminal of which is coupled through the coil 137 of a buzzer assembly 138 to ground. A correlator lamp 141 is coupled in shunt with field coil 133. Timing mechanism 135 has a series of five spring contacts 142–146 which are controlled by a rotatable cam member 148. Cam 148 is spring biased so that it normally assumes its starting or reference position illustrated in FIGURE 2. In that condition, all of contacts 142–146 are open, cam 148 holding contact 145 away from contact 146. When an alternating voltage of the appropriate magnitude is applied to field coil 133 to energize timing mechanism 135, cam 148 begins to rotate in a clockwise direction. After approximately 10° of travel, cam 148 releases contact 145 and it springs into electrical engagement with contact 146. Cam 148 continues to rotate until it reaches a final condition, approximately 90° from its starting point, at which cam 148 moves contacts 142, 143 and 144 together to establish an electrical connection therebetween. Of course, the time interval, which may be called the correlation testing interval or timing cycle, required for cam 148 to progress from its starting position shown in FIGURE 2 to its final position, 90° away, may be made as long or short as desired. It has been found that a period of ten seconds is adequate, contacts 145 and 146 closing within the first one-half second of the ten-second timing cycle. Timing mechanism 135 therefor tolls a ten-second time interval.

Correlator relay 122 controls a movable relay contact 151; when the relay is de-energized, contact 151 is spring biased to engage and make electrical contact with a fixed contact 152. On the other hand, when relay 122 is energized contact 151 is moved into engagement with contact 153. Movable contact 151 is connected to ground; contact 152 is connected to contact 146 of timing motor 135, and contact 153 is connected to the three-way junction 154 of field coil 133, buzzer coil 137 and correlator lamp 141.

Movable contact 130 of PV-TV switch 128 is also connected to the movable contact 158 of a two-position microswitch 160, actuated by an access door which is positioned by the subscriber between open and closed positions in a manner to be fully described subsequently. When the door is closed, contact 158 makes an electrical connection with a fixed contact 161 of door switch 160, and when open movable contact 158 establishes an electrical contact with fixed contact 162. Contact 162 is connected through a cyclometer pilot light 163 to ground, the pilot light serving to illuminate a cyclometer register to be described. Fixed contact 161 is coupled through a normally-closed switch 165 having a movable contact 166 which normally engages a fixed contact 167. Switch 165 is opened by mechanical apparatus to be described.

Fixed contact 167 is connected through a print solenoid 170, connected in shunt with an erase head 171, to a terminal 172 which in turn is connected to one side of each of filaments 108 and 109. The other side of each of the filaments is connected to movable contact 130 of the PV-TV switch. Print solenoid 170 and erase head 171 are employed, as will be explained, to record simultaneous charges for each program. Actually, as will be learned, two different charge registers are actuated for each program. A solenoid 174, coupled between terminal 172 and movable contact 130, serves to lock the access door which is positioned by the subscriber after certain conditions are met in the receiver, as will be explained.

Contact 142 of timing mechanism 135 is connected to ground, and contact 144 is connected to terminal 172 via a fuse 176. Contact 143 of timer motor 135 is connected to one terminal of a condenser 178, the other terminal of which is connected to the junction of correlator relay 122 and condenser 123. Condenser 178 is a relatively large capacitance in order that the time constant of relay 122 and condenser 123 may be increased considerably by adding capacitor 178 thereto. As will be learned, increasing the time constant of relay 122 permits it to remain energized for a longer interval after correlator multivibrator 120 has returned to its normal condition. In fact, by making condenser 178 sufficiently large in capacitance, relay 122 will remain energized even though several field-trace intervals occur between successive output pulses from gate 116.

It will be recalled that the waveform of the output control signal of multivibrator 26 must exhibit a particular magnitude and polarity at the instant of each correlation pulse produced in the output of gate 115 in order that gate 116 may gate those correlation pulses into multivibrator 120. Since the magnitude and polarity of the output signal of multivibrator 26 is determined at any given instant by the condition in which the multivibrator finds itself at the time, multivibrator 26 must therefore be established in a given condition at the instant of each correlation pulse in order that gate 116 is turned on during the appropriate intervals.

Contact 135 of timing mechanism 145 is connected to another input circuit 179 of multivibrator 26 in order to lock multivibrator 26, during certain intervals, in the particular one of its two stable operating conditions which results in the output signal of the multivibrator assuming a magnitude and polarity that will not turn gate 116 on. Specifically, and as will be described subsequently, when input circuit 179 is coupled to ground, multivibrator 26 is triggered to its operating condition in which it may be established during the occurrence of the correlation pulses when there is incorrect correlation. Since multivibrator 26 will remain in that condition while input circuit 179 is established at ground so that correlation pulses cannot be translated to correlator multivibrator 120, the circuit from contact 145 to input circuit 179 is appropriately called a "lock out" circuit as indicated in FIGURE 2.

While, as mentioned before, switching apparatus 60 in the transmitter may include merely a family of suitable switches for interconnecting inputs 51–56 to outputs 61–65, apparatus 60 in the receiver should take the form of that illustrated in detail in FIGURES 3–21. Those figures also illustrate in detail some of the other equipment which is shown only schematically in FIGURE 2.

*Cabinet in General*

Figures 3, 4:
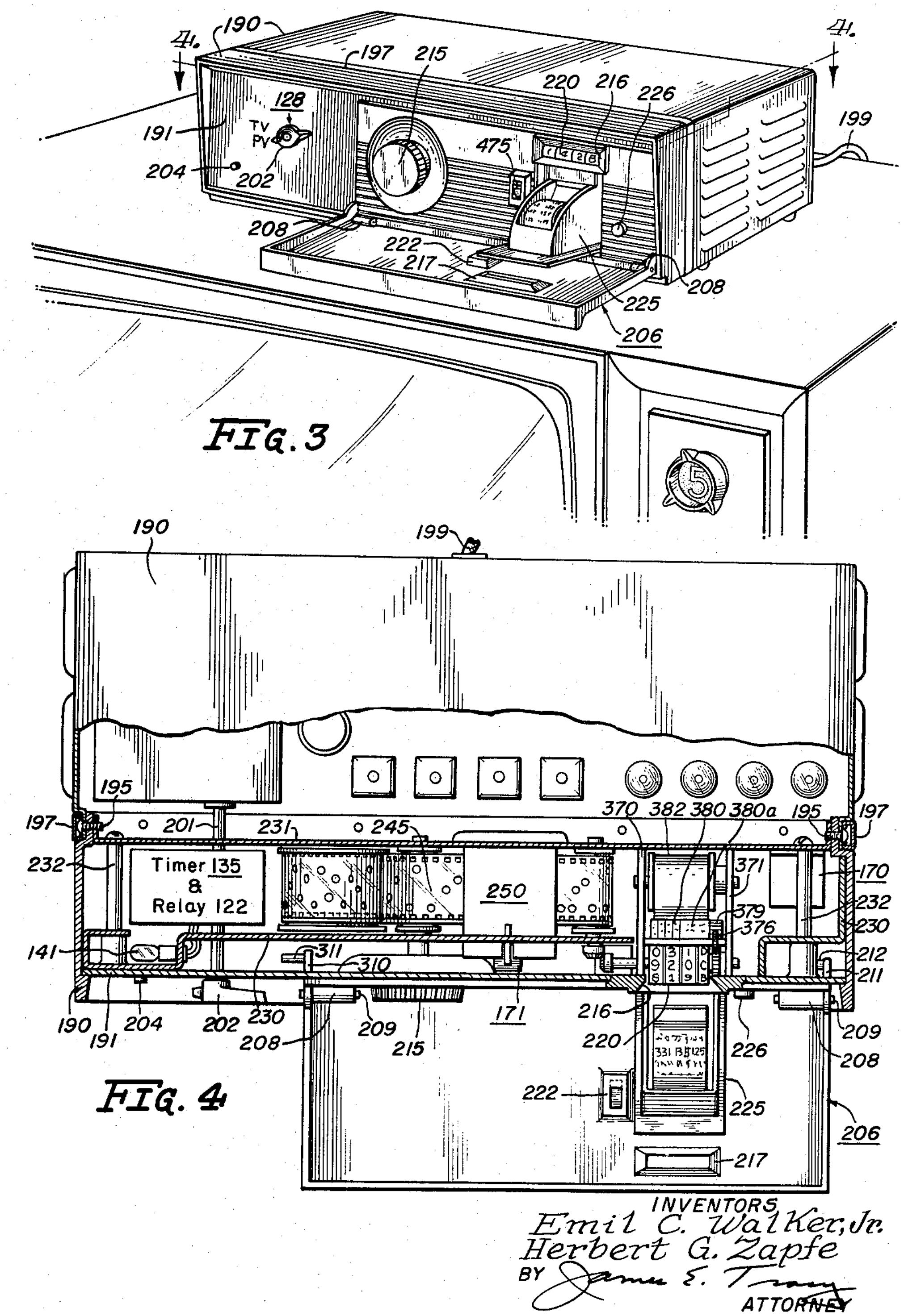

Turning now to a structural description of the mechanical apparatus shown in FIGURES 3–21, all of the circuitry and equipment required for converting a conventional television set to a subscription television receiver is housed within a two-section metal cabinet 190 having a metallic front escutcheon 191 (see especially FIGURES 3, 4 and 13). In other words, all of the equipment illustrated in FIGURE 2 with the exception of units 91–105, which are contained in any conventional television receiver, is mounted within the cabinet housing 190. The two sections of housing 190 are held together by means of screws 195, best seen in FIGURE 13. The connecting portions of housing 190 are offset to permit screws 195 to be completely recessed. A metal sealing band 197 may be wrapped around housing 190 where the two sections are joined in order to cover screws 195 and prevent unauthorized persons from breaking into the decoding equipment. To gain access to the apparatus within housing 190, the seal on metal band 197 must be broken and screws 195 removed. Of course, breaking of the seal can easily be detected by the operator of the subscription service.

As illustrated in FIGURE 3, cabinet 190, and the conversion equipment which it contains, preferably is mounted on top of a conventional television receiver. A cable 199 includes all of the necessary circuit connections to units 90–105 of the conventional television set. For convenience, it is contemplated that the subscription television conversion equipment will contain its own power supply. Most of the electrical circuitry of the decoding equipment will be mounted within the rear section of housing 190. The rear section is louvered for cooling purposes, as best seen in FIGURES 3 and 13.

The operating shaft 201 for the PV-TV switch 128 extends through front escutcheon 191 (see FIGURE 4) in order to accommodate a control knob 202 to be manipulated by the subscriber to the PV position during a subscription television program and to TV when the decoding apparatus is to be effectively disassociated from the television receiver. As will be learned subsequently, if the subscriber neglects to turn knob 202 to the PV position, the PV-TV switch will be automatically actuated to that position before code-determining switching apparatus 60 may be adjusted. A jewel 204 also extends through an aperture in escutcheon 191. Correlator lamp 141 is positioned behind the jewel (see FIGURE 4) and effects illumination thereof.

Figure 11:
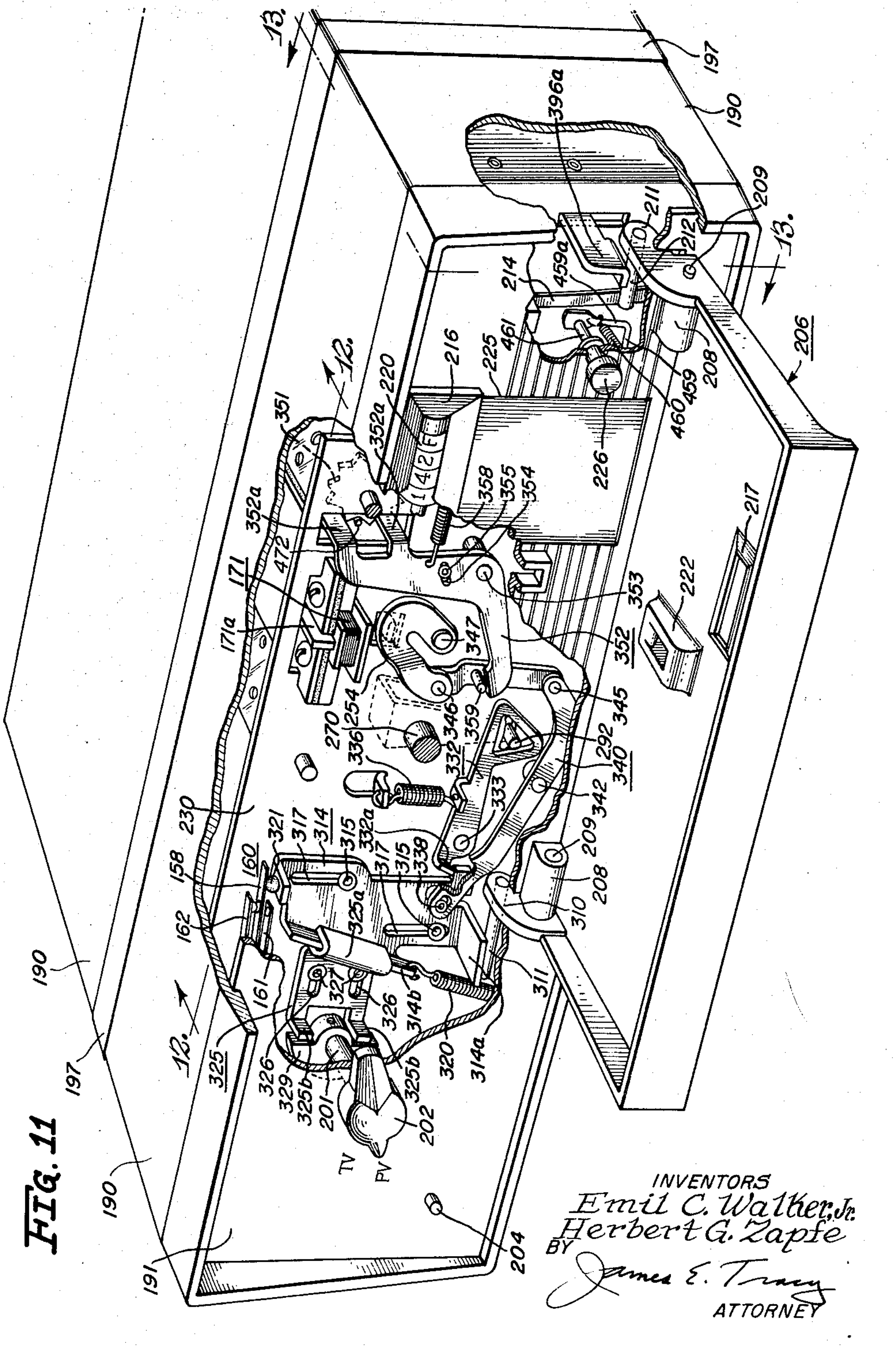
Figures 15, 16, 17:
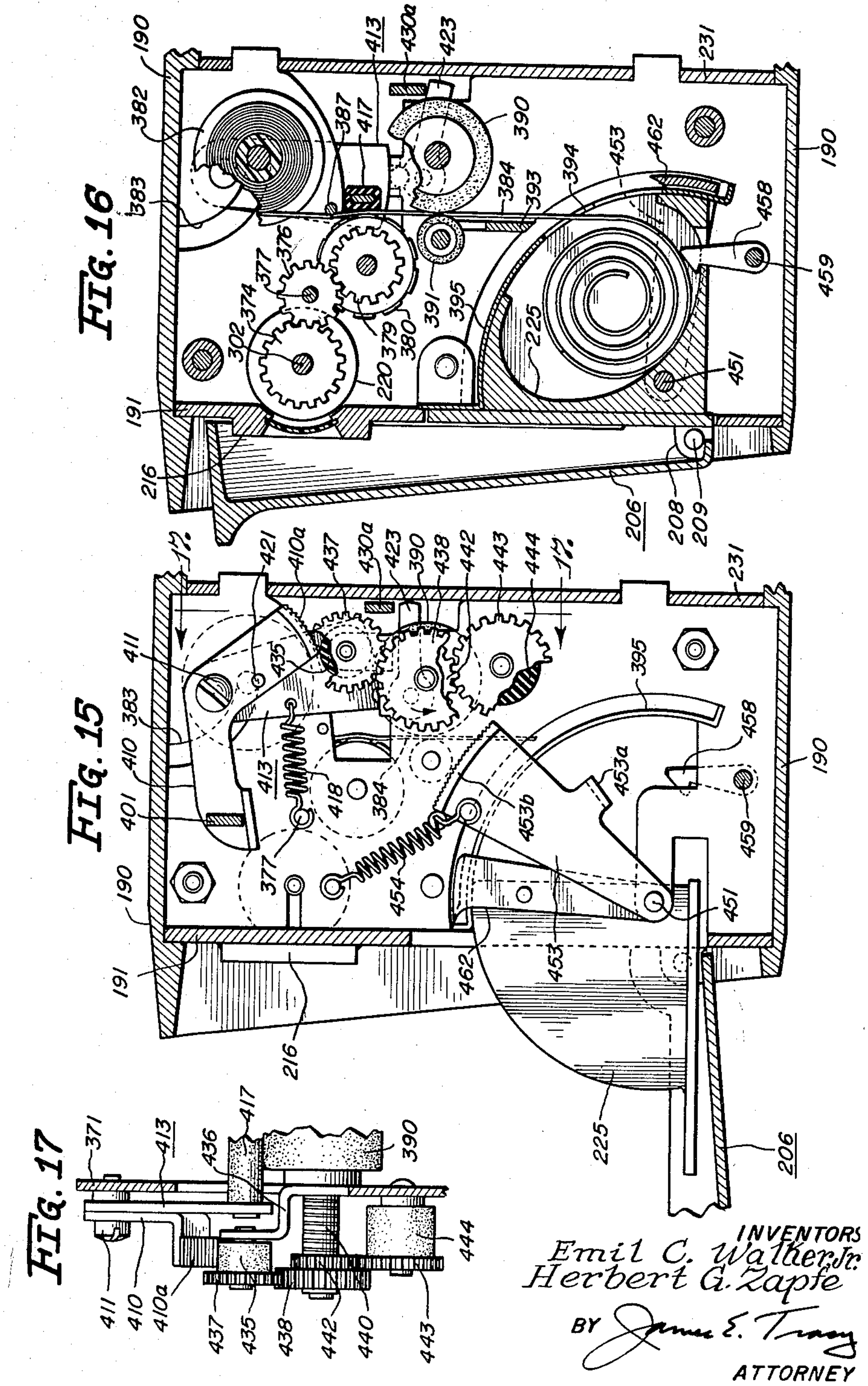

A movable access door 206, to be positioned by the subscriber, is hinged to front escutcheon 191 along the bottom thereof (see FIGURES 3, 4 and 11). Specifically, portions 208 of front escutcheon 191 are provided with cylindrical channels for receiving a pair of pins 209 which extend through apertures in door 206. Door 206 constitutes a movable mechanism to be moved by the subscriber between a first or closed position (as seen in FIGURES 13 and 16) and a second or open position (as seen in FIGURES 3, 4, 11 and 14).

A portion 211 of door 206 (see FIGURES 4, 11, 13 and 14) extends through a rectangular slot or opening in front of escutcheon 191 and contains an aperture for accommodating a stud 212. A leaf spring 214 is rigidly connected at one end thereof to the rear side of front escutcheon 191 by means of screws 218 (see FIGURE 13), the other and free end of the spring engaging stud 212 to urge it toward escutcheon 191. With this arrangement, when door 206 is moved toward its first or closed position (shown in full line construction in FIGURE 13), spring 214 serves to spring or snap the door closed as it approaches the closed position. In other words, spring 214 exerts a force on stud 212, producing a clockwise torque around pins 209, as viewed in FIGURE 13, to snap door 206 to its closed position. On the other hand, when door 206 is moved toward its second or open position (shown in broken line construction in FIGURE 13), spring 214 exerts a force on stud 212 to produce a counter-clockwise torque with pins 209 as the fulcrum to snap the door to its open position.

With door 206 opened, a manual control knob 215, or what may be called a tape transport knob for reasons which will become apparent, is accessible to the subscriber (see FIGURES 3, 4, 5 and 14). It is this knob that must be adjusted or rotated by the subscriber in either a clockwise or counter-clockwise direction in order to set switching apparatus 60 for any given program. Escutcheon 191 also contains a display window 216 (see FIGURES 3, 11, 15 and 16) which registers with another window or aperture 217 of door 206, when the door is closed, in order that the instantaneous setting of a cyclometer register 220, located behind both windows, may be read at all times regardless of the position of the door.

Cyclometer register 220 is of generally conventional construction and comprises the customary four wheels assigned, respectively, to units, tens, hundreds, and thousands. The only difference in cyclometer 220 from one of entirely conventional construction is that the indicia on the units wheel are letters rather than numerals. Each of the tens, hundreds, and thousands wheels contains ten digits ranging from 0 to 9, while the units wheel comprises any ten letters selected from the alphabet. In setting up the code-determining apparatus for a given program, the subscriber must rotate knob 215 until a prescribed combination of three digits and one letter appears in display window 216.

Door 206 also has cast therein a latch 222 which facilitates locking of the door in its closed position, in a manner to be explained, in response to actuation of door lock solenoid 174.

Figure 14:
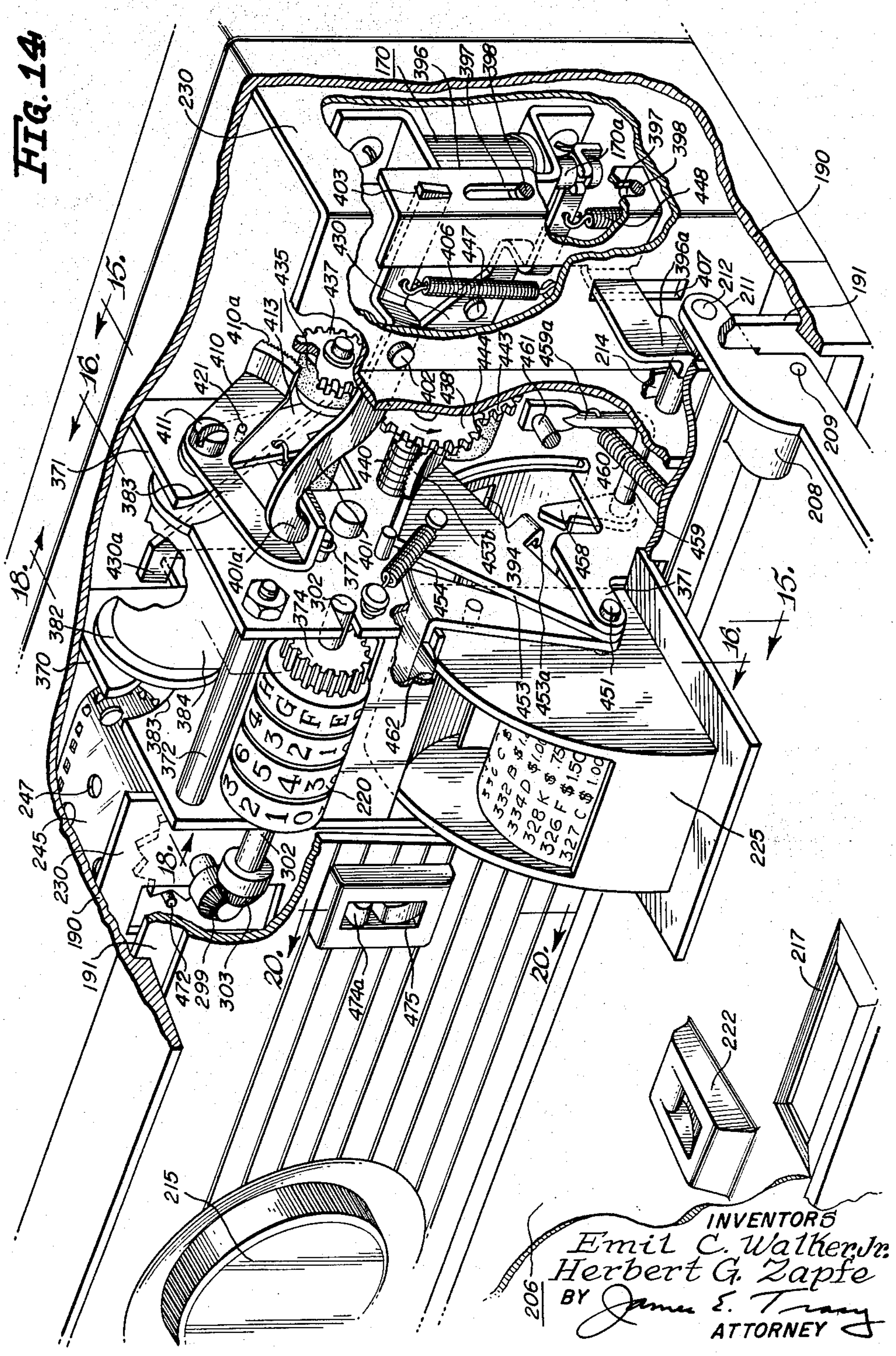

With door 206 in its open position, access may also be gained by the subscriber to a hopper or billing compartment 225 which is hinged such that it may be shifted by the subscriber between a closed position in which it is retracted behind escutcheon 191, as seen for example in FIGURE 11, and an open position in which it is swung out as seen, for example, in FIGURE 14 in order that the contents of the compartment may be accessible to the subscriber. As will be seen later, a push-button 226, also accessible in the front of escutcheon 191 when door 206 is open, must be actuated by the subscriber in order to cause hopper assembly 225 to move from its closed position to its open position.

*Tape Mechanism*

Referring now primarily to FIGURES 4–10 and 14, a front plate 230 and a back plate 231 are mounted in parallel, spaced apart relationship with respect to each other and also with respect to front escutcheon 191 by means of rigid spacing and interconnecting structure all designated by the reference numeral 232. Actually, and as best seen in FIGURES 4 and 14, plate 230, at the right end thereof, makes a right angle turn and meets back plate 231. Apertures are provided in plates 230 and 231 to accommodate a pair of parallel spaced shafts or axles 235, 236 for a pair of reels or spools 237, 238, respectively. A drive gear 241 is rigidly affixed to spool 237 and is rotatably mounted on axle 235. A companion drive gear 242, lying in the same plane as gear 241, is rigidly mounted to reel 238 and rotatably mounted on shaft 236. A perforated tape or film 245, preferably made of a polyester material such as Mylar, has one portion wound around spool 237 and another portion wound around spool 238. Tape 245, which may be called a code-bearing element for reasons which will be apparent, has a series of contact making portions, specifically perforations 247, in a sense randomly positioned on the tape. With the exception of holes 247, tape 245 is very similar to 35 mm. camera or motion picture film. Regularly spaced sprocket holes, occupying the standard sprocket hole pitch or spacing of 3/16 inch for 35 mm. film, are also disposed along both edges of tape 245.

Tape or elongated strip 245 also has disposed along one edge thereof a pre-recorded sound track 244. Preferably, the information pre-recorded on track 244 is simply a continuous sine wave. It will be seen later that portions of track 244 are erased in order to make an internal record of the programs to which a given subscriber has subscribed. The charges registered on track 244 facilitates an audit for each subscriber.

*Tape Sensing Mechanism*

The portion of tape 245 intervening that which is wound on spool 237 and that which is wound on reel 238 is guided through a matrix switch assembly 250 by means of a tape guide 248 and a sprocket 249, each of which has a shaft rotatably mounted in apertures of front and back plates 230 and 231, respectively. The teeth of sprocket 249 extend into the regularly spaced sprocket holes of tape 245, causing rotation of the sprocket as tape 245 is transported or moved. Matrix assembly 250 is rigidly connected to plate 231 and is positioned intermediate tape guide 248 and sprocket 249. Tape 245 is to be moved from one to another of a multiplicity of distinct and spaced positions, and in each such position a different 5 x 6 matrix or permutation pattern of holes 247 is presented to matrix assembly 250. It has been found that with this arrangement, a length of film 245 of approximately 31 feet may contain at least 2,000 different 5 x 6 matrix patterns.

Matrix assembly 250 includes a framework 252, preferably constructed of plastic. Screws 251 (see FIGURE 8) rigidly mount framework 252 to back plate 231. Viewed from the top, framework 252 is essentially a four-sided, rectangularly shaped open structure composed of the two parallel spaced portions or legs 252*a*, shown in cross section in FIGURE 9, and the two parallel spaced legs 252*b*, shown in cross section in FIGURE 10. A series of five rods or pins 255 are journaled in and mounted between portions 252*a* of framework 252. Rods 255 are mounted in parallel, spaced relationship with respect to each other and also with respect to portions 252*b* of framework 252.

Figures 8, 9, 10:
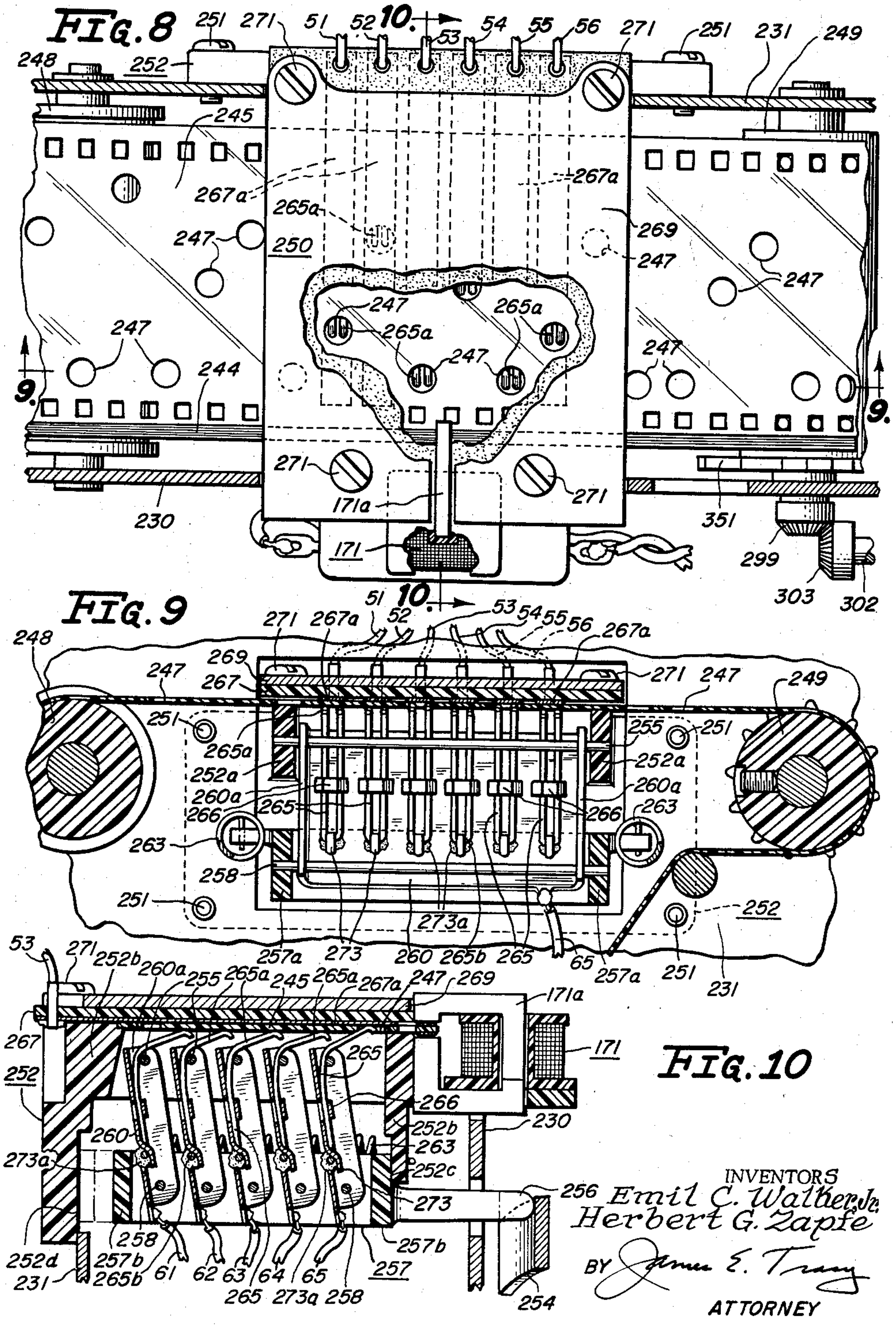

A laterally movable carriage 257 comprises a four-sided, rectangular shaped open structure having two parallel spaced portions or legs 257*a*, shown in cross section in FIGURE 9, and two spaced, parallel legs or portion 257*b*, shown in cross section in FIGURE 10. Carriage 257 also has an elongated arm of rectangular cross section extending from the right leg 257*b* (as viewed in FIGURE 10) in the direction of and through an aperture of front plate 230. As will be seen, arm 256 serves as a cam-follower. Carriage 257 is inter-connected with framework 252 in such a way that carriage 257 is horizontally movable in the direction of parallel legs 257*a*. This is achieved by providing another series of five parallel spaced rods 258 journaled in and mounted between parallel legs 257*a*. The carriage is coupled to framework 252 by means of a series of five parallel, rectangular metallic support plates 260 which interconnect rods 255 and 258. Each of plates 260 is electrically conductive and substantially flat except for two end portions which are turned or bent at right angles to provide tabs or flanges 260*a* to facilitate connections between the rods 255 and 258. Flanges 260*a* are provided with apertures for receiving rods 255 and 258. In this way, each of plates 260 is pivotably mounted to an assigned one of rods 255 and also to an assigned one of rods 258.

With this construction, framework 252, carriage 257 and plates 260 provide a parallelogram arrangement, like a set of parallel rules; no matter where carriage 257 is positioned, it is always parallel to the plane defined by rods 255, and plates 260 are always parallel to each other. The limit of horizontal travel of carriage 257 is best seen in FIGURE 10. One extreme position of the carriage is shown in that figure in full-line construction. Portion 252*c* of framework 252 provides a stop for carriage 257. When the carriage is moved horizontally to the left in FIGURE 10, it is stopped by portion 252*d* of framework 252. This extreme position is shown in broken-line construction in FIGURE 10. A pair of coil springs 263 are connected between carriage 257 and framework 252 to urge carriage 257 to the full-line position shown in FIGURE 10.

A cam member 254 (see FIGURE 10), actuated in a manner to be described, engages arm 256 and pushes it, thereby moving carriage 257, to the left against the tension of springs 263 toward back plate 231. Specifically, cam 254 moves in a direction perpendicular to and up from the view in FIGURE 10. Cam 254 and cam follower 256 are also shown in FIGURE 12. As will be described later, cam 124, as viewed in that figure, rotates selectively in both counter-clockwise and clockwise directions.

A series of six separate, parallel spaced, bi-filar resilient spring contact members 265 are mounted to each of the five support plates 260; consequently, there is a total of thirty resilient members 265. Each spring 265 consists of a length of conductive wire having a 180° bend at the middle such that the wire doubles back on itself to form two parallel, bi-filar portions. As viewed in FIGURES 10 and 21, each spring member 265 is of generally L-shaped configuration, the long leg of the L lying against a surface 260*b* and being mounted at its end portion 265*b* to an assigned one of plates 260. More specifically, the mid-point of the long leg of the L of each member 265 is loosely retained in a guide 266 formed out of its associated plate 260 and end 265*b* is rigidly secured by means of a tab 273, also formed out of plate 260, and a solder connection 273*a*. The short leg of the L, constituting a spring contact 265*a*, is a free end which protrudes above its associated plate 260; it consists of the two ends of the single wire comprising a spring member 265.

Thus, each of plates 260 provides a support for an associated resilient member 265 which has one end 265*b* fixed to the support (by means of tabs 273 and connections 273*a*), an intermediate portion normally lying against a surface 260*b* of the support, and a free end 265*a* displaced in a given direction (to the right as viewed in FIGURES 10 and 21) from the intermediate portion and presenting a contact surface.

The portion of tape 245 extending through matrix 250 is disposed immediately above spring contacts 265*a*. A printed circuit panel 267 lies above both tape 245 and spring contacts 265*a* and contains a series of six parallel spaced, flat, conductive strips 267*a* printed thereon on the side immediately adjacent tape 245. Spring contacts 265*a* and flat contact surfaces 267*a* are so positioned with respect to each other that a series of five contacts 265*a*, one from each of the five plates 260, are disposed below each one of conductive strips 267*a*. Whether or not one or more of the five contacts 265*a* associated with each strip 267*a* establishes an electrical connection with the strip is determined by the matrix permutation of perforations 247 presented to matrix assembly 250 at the time. A metallic plate 269 is positioned immediately above printed circuit panel 267, and it along with panel 267 is mounted to framework 252 by means of screws 271.

Input circuits or conductors 51–56 are respectively electrically connected, such as by soldering, to the six parallel conductive strips 267*a*. Output circuits or conductors 61–65 are respectively electrically connected to the five plates 260, also by soldering. Since plates 260 are constructed of a conductive material and since conductive spring contacts 265*a* are mechanically and electrically connected to plates 260 by means of tabs 273 and solder connections 273*a*, output conductors 61–65 are electrically connected to the contacts 265*a* of their associated plates 260.

As mentioned previously, springs 263 urge carriage 257 to the full-line position shown in FIGURE 10. In that position, contacts 265*a* are spring biased to bear against the underside of perforated tape 245. If an aperture 247 in tape 245 lies immediately above any one of the thirty spring contacts 265*a*, that contact projects through the aperture or contact making portion to make an electrical contact with the conductive strip 267*a* lying immediately thereabove. In FIGURE 10 it will be observed that the contact 265*a* on the extreme right has a hole 247 immediately thereabove and it extends through that aperture to engage a strip 267*a*. The sections of tape 245 that prevent contacts 265*a* from establishing an electrical connection with the associated strips 267*a* constitute contact breaking portions.

*Contact Wiping Action*

It is to be noted that stationary switch contacts 267*a* lie above movable contacts 265*a*. This expedient is employed in order to prevent contamination or fouling of the switching apparatus by settling dust particles. The contact making arrangement also features a unique bidirectional wiping action to insure further that any foreign materials, such as dirt or grease, that may accumulate on flat contact surfaces 267*a*, or on contacts 265*a*, are displaced so that nothing interferes with the establishment of the electrical connections.

Figure 21:
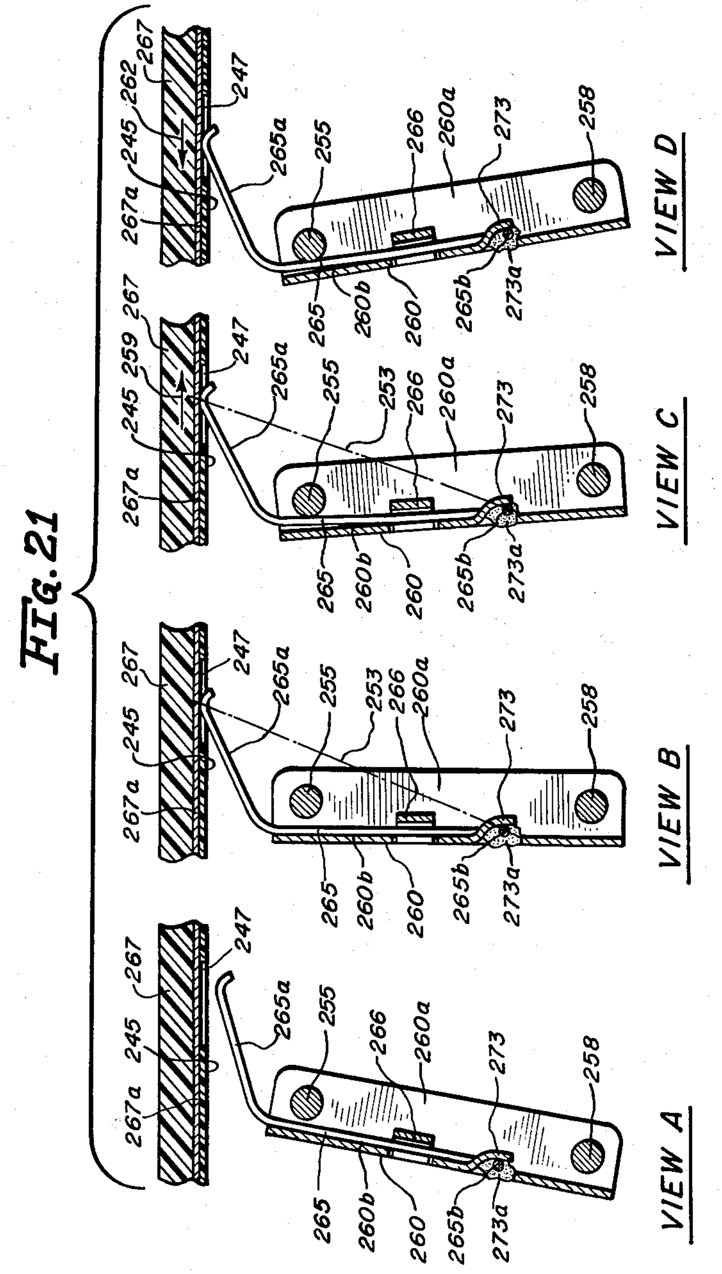

This feature is fully illustrated by the four separate views A–D making up FIGURE 21. Each of the four views shows a single one of elongated, movable resilient members 265 and its associated plate 260 in four different positions. View A shows the retracted position of resilient member 265 when the contact surface of its free end 265*a* is completely out of engagement with tape 245 and the flat contact surface 267*a* assigned thereto. The contact surfaces may be so disengaged by moving carriage 257 to the left in FIGURE 10 under the control effect of cam 254. When the cam is subsequently rotated clockwise in FIGURE 12 (in a perpendicular direction toward the drawing as viewed in FIGURE 10), coil springs 263 cause carriage 257 to move toward front plate 230.

The position in which resilient member 265 finds itself at the instant the contact surface of its free end 265*a* makes initial contact with its associated stationary flat contact surface 267*a* through a perforation 247 is shown by View B in FIGURE 21. At that instant, there is a force along line 253, which extends from the anchor end 265*b* of resilient member 265 to the point of contact of free end 265*a* and flat contact member 267*a*, toward surface 267*a*. In the position shown in View B, the angle defined by flat contact surface 267*a* and line 253 is within the critical angle. To elucidate, the force along line 253 and toward fixed contact 267*a* may be resolved into two components—one which is perpendicular to and toward flat contact 267*a* and another which is parallel to contact surface 267*a* and extending to the right. The critical angle may be defined as that angle in which the perpendicular force component multiplied by the coefficient of friction of flat contact surface 267*a* equals the parallel force components. Under such circumstances, resilient spring member 265 would be held in position. However, by making the angle between line 253 and surface 267*a* less than the critical angle, as in the present application, the parallel force component is greater than the perpendicular component multiplied by the coefficient of friction, resulting in movement of free end 265*a* to the right. Thus, as carriage 257 continues to move to the right in FIGURE 10 under the influence of springs 263, shaft 258 moves from the position shown in View B to that shown in View C of FIGURE 21, and during that movement free end 265*a* slides or wipes to the right as shown by arrow 259.

To more fully understand the reason that free end 265*a* moves to the right as shaft 258 moves in the same direction, it is helpful to consider the effect of the stiffness of resilient member 265. Because of that stiffness the triangle formed by member 265 and line 253 tends to remain unchanged. In other words, the angle between the short leg 265*a* of the L and the long leg of the L tends to remain constant. As the contact assembly, comprising support 260 and member 265, pivots about the fulcrum point defined by shaft 255 in moving from the position shown in View B to that shown in View C, stationary contact 267*a* exerts a force on free end 265*a*, inasmuch as the anchor end 265*b* moves closer to contact 267*a*, tending to compress free end 265*a* and shorten the line 253 of the triangle. However, due to the stiffness of member 265, line 253 will tend to remain of the same length in going from the position of View B to that of View C and the only way for this to be accomplished is for resilient member 265 to bend or flex away from surface 260*b* to the right until it bears against shaft 255. Of course, the greatest bending moment will exist at end 265*b* of spring member 265. Thus, maximum bending takes place at that point.

In the position shown in View C, flexing of resilient member 265 is arrested by shaft 255. Thus, as support plate 260 and pin 258 continue to pivot to the right about shaft 255, free end 265*a* winds around shaft 255 and thus reverses direction and moves to the left as shown by arrow 262. In other words, shaft 255 serves as a fulcrum point for resilient spring member 265 once the position of View C is attained so that as plate 260 approaches the position shown by View D free end 265*a* wipes flat contact surface 267*a* in the reverse direction.

By limiting the travel distance of plate 260 from View C to View D, the contact surface of free end 265*a* may be arranged to wipe, in the direction of arrow 262, only part of the area of fixed contact 267*a* previously wiped in the direction of arrow 259. Obviously, such bi-directional wiping action is ideal for establishing an electrical contact. The movable contact first moves over a prescrbed area with a wiping action to displace foreign materials that may interfere with proper contact and then moves backward on the wiped surface, reaching a final resting position with the area wiped clean by the first motion. With such an arrangement, the possibility of a faulty electrical connection is virtually eliminated.

To review, very briefly, the operation of switching matrix 250, conductive strips 267*a*, which constitute input contacts, are permutably connected to contacts 265*a*, which constitute output contacts, in accordance with the matrix pattern of perforations 247 of tape 245 presented to such input and output contacts. Of course, since conductors 51–56 are electrically connected to input contacts 267*a* and since output circuits 61–65 are electrically connected to output contacts 265*a*, the pattern of perforations 247 lying below printed circuit panel 267 also determines the instantaneous interconnection pattern between such input and output conductors.

*Tape Transport*

In order to change the permutation pattern, the tape is moved to a different and spaced position, in a manner to be described, thereby to present a different pattern of apertures 247 to matrix switch assembly 250. Before tape 245 is moved, however, output contacts 265*a* are preferably displaced or retracted from the tape to avoid possible damage to the tape and contacts. This is realized by the subscriber merely swinging door 206 to its open position which, in a manner to be described in discussing FIGURE 12, actuates cam 254 so that carriage 257 moves laterally toward portion 252*d* of framework 252 (see FIGURE 10) against the bias of springs 263. As carriage 257 is so moved, spring contacts 265*a* retract to the position shown by view A of FIGURE 21 so that all pressure of contacts 265*a*, and in fact physical engagement, is removed from the underside of tape 245. This permits movement of film 245 without interference from spring contacts 265*a*.

Of course, when tape 245 is moved to a different position, it is desired that the apertures 247 line up precisely between input contacts 267*a* and the associated row of output contacts 265*a*. Such operation is facilitated by detent means in a manner to be described.

Figure 5:
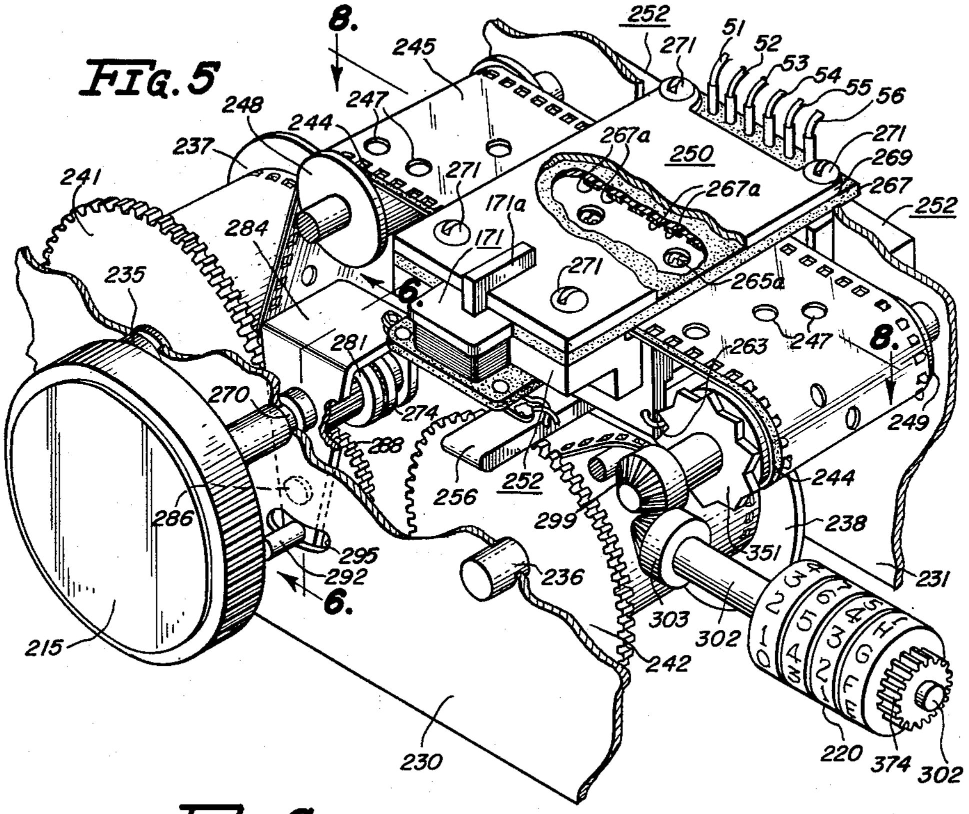
Figures 6, 7:
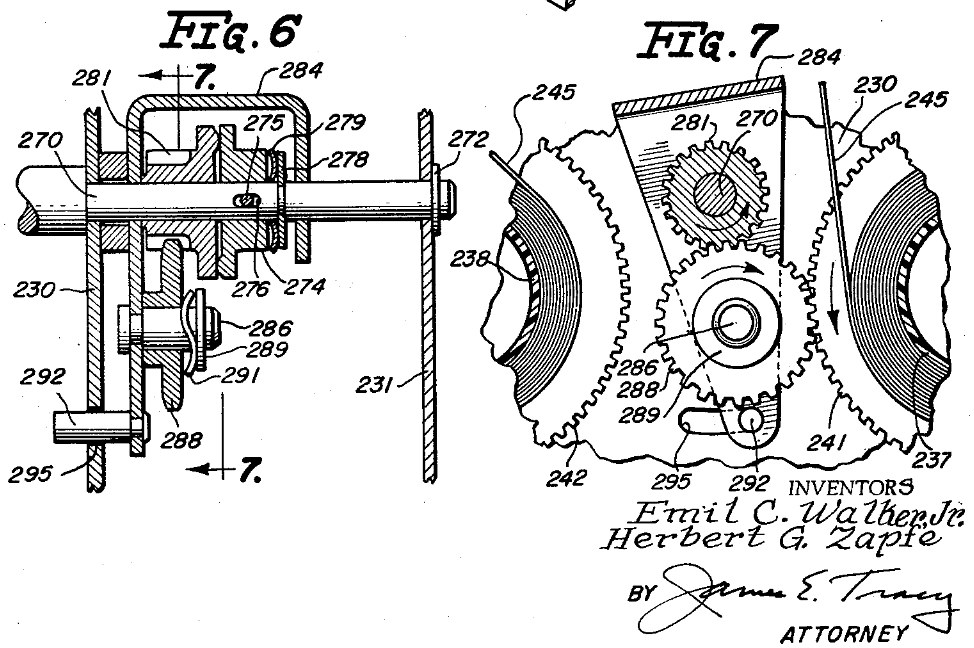

Movement of tape 245 is accomplished by the mechanism shown primarily in FIGURES 5–7. Control knob 215 is rigidly connected to a shaft 270 which is journaled in apertures of plates 230, 231. A C-shaped snap ring 272 is positioned in an annular groove of shaft 270 on the outside of plate 231 to captivate shaft 270 in position. A relief clutch 274 is mounted to shaft 270 by means of a pin 275 which extends through a slot 276 of the shaft. In other words, pin 275 is a part of relief clutch 274 and is perpendicular to the axis of, and extends through, shaft 270. With this arrangement, relief clutch 274 rotates in response to rotation of knob 215 and shaft 270, but the clutch is free to move in a lateral direction (namely to the left or right in FIGURE 6) due to slot 276. A ring washer 278 is positioned in an annular groove of shaft 270 and a cupped spring 279 is disposed between ring 278 and clutch 274 in order to bias the clutch towards the left in FIGURE 6.

A pinion 281 is rotatably mounted on shaft 270 adjacent clutch 274. The opposing faces of pinion 281 and clutch 274 are of irregular configuration. A shifter arm 284 is rotatably mounted on shaft 270 and embraces pinion 281 and clutch 274. Lateral movement of pinion 281, namely movement along the axis of shaft 270, is permitted by shifter arm 284 and clutch 274. The tension of spring 279 urges the irregular face of clutch 274 into mating engagement with the irregular face of pinion 281. Thus, under normal conditions, rotation of clutch 274 effects concurrent rotation of pinion 281.

A stud 286 is rigidly connected at one end to shifter arm 284 and an idler gear 288 is rotatably mounted on the stud and meshes with the teeth of pinion 281. Gear 288 is maintained in position by means of a ring 289 mounted to stud 286 and a friction washer 291 disposed between the gear and the ring. Gear 288 is driven by pinion 281 and lies in the plane of drive gears 241 and 242 in order that it may selectively engage either of those drive gears.

While shifter arm 284 is rotatably mounted on shaft 270, its rotation is restricted by means of a pin 292, rigidly attached to shifter arm 284 and extending into a slot 295 of front plate 230. Ordinarily, pin 295 occupies a reference or rest position in the middle of slot 295 as illustrated in FIGURES 5 and 12. Actually, as will be described later, pin 292 is locked in that position by mechanism actuated by door 206 when the door is closed. By locking pin 292 in that position, adjustment of the code-determining apparatus is prevented. The operation of shifter arm 284 is best seen in FIGURE 7, which views the driving mechanism in the direction from back plate 231 toward front plate 230, as shown by the arrows in FIGURE 6. Accordingly, it should be remembered that when shifter arm 284 rotates in one direction as viewed in FIGURE 7, it rotates in the opposite direction as viewed in FIGURE 5. When arm 284 is rotated in a counter-clockwise direction (as viewed in FIGURE 7), which results from rotating knob 215 clockwise (as viewed in FIGURE 5), to the limiting position in which pin 292 lies at the extreme right end of slot 295, idler gear 288 engages drive gear 241 to effect movement of tape 245 in one direction. On the other hand, when shifter arm 284 is rotated in a clockwise direction, resulting from counter-clockwise rotation of knob 215, to the limiting position in which pin 292 lies at the left end of slot 295 (as viewed in FIGURE 7), gear 288 engages drive gear 242 to move film 245 in the other direction.

*Erase Head*

Erase head 171 is mounted to framework 252 and includes a split or gapped square-shaped core structure 171*a*. The gap of the core structure is made wide enough and is positioned to embrace the edge portion of tape 245 which contains the prerecorded sound track 244. As will be seen, erase head 171 is energized by the same A.C. voltage source that energizes filaments 108 and 109. In response to energization of the heaters, a portion of track 244 is erased. This provides a record for auditing purposes that the permutation pattern of apertures 247 presented to the input and output contacts at the time (which pattern is assigned to a given program) has been employed by the subscriber; each erased section therefore indicates that the associated program has been viewed.

*Cyclometer Register*

A mitre gear 299, see FIGURES 5 and 14, is rigidly connected to the end of the shaft of sprocket 249 adjacent front plate 230. The operating shaft 302 of cyclometer register 220 is provided with a mitre gear 303 which meshes with gear 299. Thus, rotation of gear 299, which results from movement of perforated tape 245 in either direction, drives companion gear 303 in order to actuate the cyclometer register and display different indicia in window 216 for each permutation pattern of perforations presented to input contacts 267*a* and output contacts 265*a*. Of course, when tape 245 is initially installed it is necessary that register 220 be appropriately positioned so that the number-letter combinations appearing in window 216 are matched with the permutation patterns in accordance with a master code at the transmitter. In this way, when a prescribed combination appears in each subscriber's window 216, the same pattern of holes 247 will be presented to the input and output contacts in each receiver.

*PV-TV Switch Operator*

Door 206 has a portion or arm 310 (see FIGURES 11 and 12) which extends through an aperture of escutcheon 191. A stud 311 is rigidly connected at one end thereof to arm 310 and pivots around a fulcrum defined by pins 209 as door 206 is opened or closed. As door 206 is opened, stud 311 rides against a tab 314*a* of a slide member 314. A pair of studs 315, rigidly mounted to front plate 230, slide in a pair of slots 317 of slide 314. C-shaped snap washers are mounted to the ends of studs 315 in order to captivate slide 314. Slots 317 are parallel to each other and to the vertical path defined by stud 311 when it is moved by opening or closing door 206. Slide 314 is normally urged to the position shown in FIGURE 12 by a coil spring 320 which connects to an anchor tab of front plate 230. When door 206 is opened, stud 311 raises to the position shown in FIGURE 11, pushing against tab 314*a* and against the tension of spring 320. There is also mounted on slide 314 an element 321 of some insulating material which engages spring contact 158 of door switch 160 when door 206 is opened to the position shown in FIGURE 11. By that action, contacts 158 and 161 are broken whereas contacts 158 and 162 are closed. Spring contact 158 is biased to normally engage spring 161.

A switch positioning slide 325 (see FIGURES 11 and 12) has a pair of parallel slots 326, perpendicular to slots 317, which accommodate a pair of studs 327 mounted at one end thereof to front plate 230. A pair of C-shaped snap washers maintain slide 325 in place. Slide 325 has a portion 325*a* which doubles back on itself to form a U-shaped groove which rides in a flange portion 314*b* of slide 314.

Slide 325 also has a pair of right angle tabs 325*b* adapted to engage a semi-circular element 329 rigidly attached to shaft 201 of PV-TV switch 128. As door 206 is opened, slide 314 raises which in turn urges slide 325 to the left (in FIGURE 12) by the action of flange 314*b* and portion 325*a* so that in effect slide 325 is cammed to the left. This movement causes tabs 325*b* to engage element 329, resulting in a positioning of the PV-TV switch to the PV position, if the subscriber has not already placed it there. This feature relieves the subscriber of the requirement of positioning knob 202 to the PV position before a subscription television program; he merely moves door 206 to its open position and the switch is positioned accordingly.

*Decoder Interlock*

An interlock lever 332 (see FIGURES 11 and 12) is rotatably or pivotably mounted at one end to front plate 230 by means of a stud 333. Lever 332 has a triangular shaped cutaway portion which accommodates stud 292. A coil spring 336 is connected between a tab of front plate 230 and a tab of lever 332 in order to urge the lever to the position shown in FIGURE 12. In this position, stud 292 is held in one corner of the triangular opening of lever 332 to center the stud between drive gears 241 and 242 and preclude movement of tape 245.

Lever 332 has a tab 332*a* which is engaged by a shoulder 314*c* of slide 314 when the slide is raised in response to opening of door 206. During that movement, shoulder 314*c* raises tab 332*a* and rotates lever 332 in a clockwise direction against the tension of spring 336 to the position shown in FIGURE 11. With lever 332 in this position, pin 292 is free to move throughout slot 295 and movement of tape 245 in either direction is permitted. Shoulder 314*c* is so positioned that it does not actuate lever 332 until door 206 is almost completely opened. This is desirable in that it prevents the subscriber from opening the door partway and rotating knob 215 to move the tape to a different position.

*Carriage Actuator*

A stud 338 is rigidly mounted to slide 314 and extends through a slot 340*a* of an idler link 340. Link 340 is captivated to slide 314 by means of a C-shaped snap washer which is mounted to the free end of stud 338. Link 340 is also pivotally mounted to front plate 230 by means of a stud 342 and a C-shaped snap ring. A cam drive link 344 couples link 340 to cam 254, the connections being made by a pair of studs 345, 346 along with another pair of C-shaped snap washers. Cam 254 is rotatably mounted by means of a stud 347 and a C-shaped snap ring to plate 230.

With this arrangement, when stud 311 raises slide 314, stud 338 rocks idler link 340 around stud 342 in a clockwise direction, causing cam drive link 344 to descend and effect counter-clockwise rotation of cam 254. This causes actuation of cam follower 256 and carriage 257 is moved toward back plate 231 to disengage the input and output contacts.

The shapes of links 340 and 344 and cam 254 may be made so that as door 206 is opened, carriage 257 is moved to retract spring contacts 265*a* from the underside of tape 245 before lever 332 frees stud 292. In this way, movement of tape 245 is prevented until after the input and output contacts have been disengaged to avoid possible damage to the tape and contacts which may otherwise occur were the tape to be transported while the input and output contacts were still in engagement through the tape.

Lever 332 may be considered locking means for preventing adjustment of the code-determining switching apparatus when access door 206 is established in its closed position. Cam 254 constitutes means coupled to movable mechanism 206 for separating input contacts 267*a* and output contacts 265*a* when door 206 is moved from its closed position to its open position. Slide 314 provides means coupled to door 206 for actuating locking means 332 when door 206 is moved from its closed position to its open position, but subsequent to the actuation of disconnecting means 254, in order that adjustment of the code-determining apparatus, namely movement of tape 245, is prevented until after the input and output contacts have been disengaged.

*Tape Registration*

A star wheel 351, rigidly connected to sprocket 249 (see FIGURES 5, 11 and 12), is actuated by means of a detent device or lever 352 which is rotatably mounted to plate 230 by a stud 353 and an associated captivating C-shaped snap ring. A guide slot 354 is provided in detent lever 352 to accommodate a stud 355 rigidly mounted at one end to front plate 230. Again, a C-shaped snap ring maintains device 352 in place. A spring 358 connected between lever 352 and plate 230 urges detent lever 352 to the position shown in FIGURE 12. Lever 352 has a pair of tabs 352*a* which engage and position star wheel 351. Star wheel 351 is so constructed that tabs 352*a* detent sprocket 249 to the closest distinct position so that the pattern of perforations 247 presented to the input and ouput contacts of switch matrix 250 are in precise registry therewith. In other words, if the registration is not correct, sprocket 249 will be in a position such that star wheel 351 does not occupy the exact position shown in FIGURE 12. However, when detent lever 352 is urged against star wheel 351, the wheel is rotated slightly so that it "zeros-in" to the appropriate position.

Of course, tabs 352*a* must be removed from star wheel 351 when tape 245 is to be moved to a new position. This is done by opening door 206. By that movement, cam drive link 344 is lowered as described previously. A stud 359, rigidly connected to link 344, lies adjacent a portion 352*c* of lever 352 to engage that portion and rotate the lever in a counter-clockwise direction against the tension of spring 358 to the position shown in FIGURE 11. There, star wheel 351, and consequently sprocket 249, are free to rotate.

It is desirable that, as door 206 moves from its open to its closed position, detent lever 352 reaches the position shown in FIGURE 12 to zero-in code-bearing element 245 before cam 254 effects engagement of the input and output contacts. Otherwise, the detent operation would be hindered by pressure of output contacts 265*a* against input contacts 267*a*. Additionally, there is a possibility that output contacts 265*a* would be damaged.

Cam 254 may be considered connect-disconnect means, coupled to movable door mechanism 206, for connecting input contacts 267*a* to output contacts 265*a* when door 206 is moved from its open position to its closed position and for disconnecting the input contacts and the output contacts when door 206 is moved from its closed position to its open position. Device 352 provides detent means coupled to door 206 and operable when the door is moved from its open position to its closed position, but prior to the operation of connect-disconnect cam means 254, for detenting tape 245 to the closest one of its multiplicity of distinct and spaced positions before input contacts 267*a* are connected to output contacts 265*a*.

*Print Mechanism*

The subscriber receiver also embraces, in accordance with the present invention, a printing mechanism for recording a charge for each program viewed by a subscriber on a billing tape that may be removed by the subscriber from time to time in order that he may make payment for the charges assessed. Specifically, the print mechanism is shown primarily by FIGURES 4 and 14–19. A pair of parallel, spaced apart side plates 370, 371 are rigidly connected between and perpendicular to plates 230 and 231. FIGURE 14 shows one element 372 for providing at least a portion of the necessary spacing and interconnecting structure for plates 370 and 371. Cyclometer register 220 has a gear 374, constructed of plastic, rigidly connected to its wheel containing the letter indicia. The shaft 302 for register 220 is journaled in both plates 370 and 371. A coupling gear 376 (best seen in FIGURE 16), preferably constructed of plastic, is rigidly mounted on an axle 377 which extends between and is journaled in both plates 370 and 371. Gear 376 is arranged to couple gear 374 to a gear 379 which is rigidly connected to a print wheel assembly 380.

This assembly is essentially a duplication of cyclometer register 220 and contains a series of four wheels that rotate in synchronism with respective ones of the four wheels of the cyclometer register. Gear 379 is preferably made a part of print wheel 380*a*, see FIGURE 4. The print wheels are preferably constructed of nylon and contain indicia in the form of raised type which not only duplicates the indicia on the wheels of the cyclometer register but in addition displays the price associated with each cyclometer combination. Print wheel 380*a*, which is wider than the other three print wheels (as seen in FIGURE 4), rotates in step with the latter wheel of cyclometer register 220 and contains a duplication of the ten letters of the register plus a price designation alongside each letter. Preferably, several different prices are employed; if desired, a different price may be associated with each of the ten letters. The position of the letter wheel of cyclometer register 220 therefore sets up the price for each program. In order words, when the letter B, for example, is displayed in window 216 for a selected program, the price for subscribing to that program will be, for example, 25 cents. Print wheel 380*a* will then have been rotated to a position such that the raised type of the letter B and the price of 25 cents face back plate 231 immediately adjacent a line blank portion of paper billing tape 384 in readiness for a subsequent printing operation in a manner to be described.

A spool 382 is positioned between parallel plates 370 and 371 and contains a quantity of blank billing tape 384 on which charge information is to be recorded. Preferably, billing tape 384 actually contains two separate layers or laminations, one of a thin, semi-porous paper (similar to that used in an adding machine) and the other comprising relatively soft and dense carbon paper. For convenience, reference numeral 384 designates the combination of both layers. The number-letter combination for each program viewed is to be recorded on successive line spaces of tape 384. It is contemplated that a roll of billing tape will accommodate approximately 400 recorded entries; the billing tape need not be replaced until almost 400 programs have been viewed.

Side plates 370 and 371 are provided with a pair of curved slots 383 for accommodating the two ends of the shaft for spool 382. In this way, the spool may be removed from the top of the assembly when it is necessary to provide a new roll of billing tape 384. This, of course, is to be accomplished by the operator of the subscription service. The billing tape is guided by a roller 387, rotatably mounted to plates 370 and 371, and a pair of rubber roll members 390, 391 such that a line portion or space of billing tape 384 lies against the single row of raised type of print wheel assembly 380 that faces back plate 231, as best seen in FIGURE 16. The carbon paper layer of billing tape 384 is immediately adjacent the print wheel assembly. In this way, when the billing tape is struck from the direction of back plate 231, in a manner to be explained, the single row of raised type prints the same indicia on the paper tape by virtue of the presence of the carbon paper. Rubber roll 391 is freely and rotatably mounted to plates 370 and 371 and functions to exert a pressure against tape 384, and also against rubber roll 390, the billing tape being fed between the two rubber rolls. Roller 390 is driven in a manner to be explained and serves as a feed roll.

Figure 18:
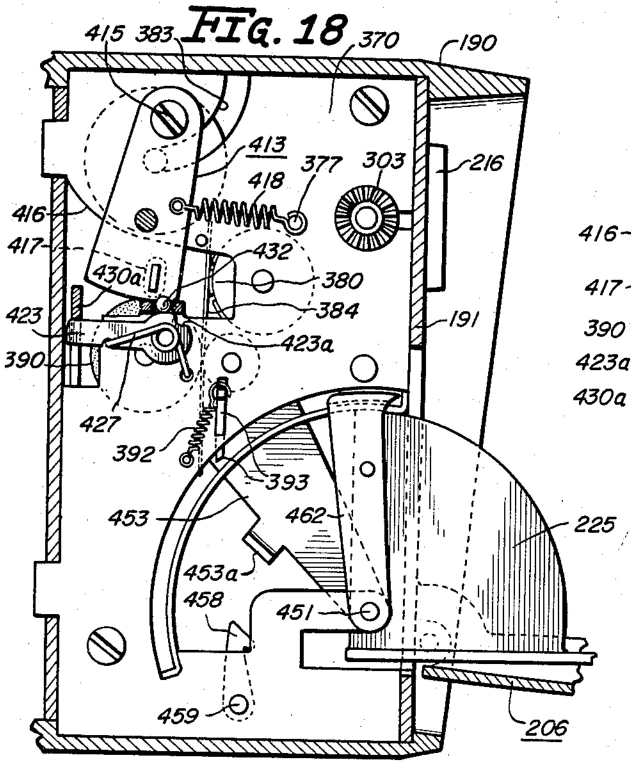

A fixed knife or cutter blade 393 is connected at its two ends to plates 370 and 371 in floating fashion. Specifically, cutter 393 extends into slots of plates 370 and 371 having length dimensions permitting vertical play of the cutter. A pair of coil springs 392, only one of which is shown in FIGURE 18, connect the extremities of knife blade 393 to plates 370 and 371 in order to bias the blade downwardly. Roll members 390 and 391, and cutter 393 cooperate to guide tape 384 into an aperture 394 of a curved plate 395 which is mounted between plates 370 and 371. Aperture 394 registers with the opening of compartment 225 when it is established in its closed or flush position, as shown in FIGURE 16. As will be seen, rubber feed roll 390 rotates in a counter-clockwise direction (as viewed in FIGURE 16), to draw tape 384 from spool 382 and feed it into hopper 225 wherein the tape coils as shown in FIGURE 16.

A slide member 396 (see primarily FIGURES 13 and 14), having a right angle cross section, is disposed in the corner of plate 230 where it turns in the direction of back plate 231. A pair of aligned guide slots 397 are provided in slide 396 for accommodating a pair of studs 398 each of which is mounted at one end thereof to plate 230. A pair of C-shaped snap rings are provided on the free ends of studs 398 to captivate slide 396. A cocking lever 401 is pivotably mounted to front plate 230 by means of a stud 402. One end of lever 401 extends into an aperture 403 of slide 396, the aperture being only slightly larger than the cross section of lever 401. A coil spring 406 connects lever 401 to a tab of plate 230 to urge slide 396 downwardly to the position shown in FIGURE 13.

Slide 396 has a portion 396*a* which extends through an aperture 407 of plate 230 and into the path of stud 212 when door 206 is opened. When the door is moved from its closed position shown in FIGURE 13 to its open position shown in FIGURE 14, stud 212 raises portion 396*a* and consequently slide 396, against the tension of spring 406, to the position shown in FIGURE 14.

*Tape Feed Mechanism*

A tape advance lever 410 (see FIGURES 14 and 15) is rotatably mounted to side plate 371 by means of a stud 411 which is screwed into threads of an aperture of the plate. A U-shaped print hammer arm assembly 413 has one end rotatably mounted by means of stud 411 while the other end is mounted to side plate 370 by means of a stud 415 screwed into that plate (see FIGURE 18). Hammer arm assembly 413 contains a printing platen 417, specifically a metallic bar preferably covered with rubber, which is free to move in a pair of slots 416 in side plates 370 and 371. A pair of coil springs 418 connect hammer arm assembly 413 with the two ends of shaft 377, respectively, in order to urge assembly 413, and consequently platen bar 417, toward the position shown in FIGURES 16 and 18*a*. In that position, platen bar 417 engages billing tape 384 and pushes the paper tape portion against the carbon paper layer and the single row of raised type of print wheel assembly 380 adjacent tape 384 at the time.

Hammer arm assembly 413 has a stud 421 (see FIGURES 14 and 15) rigidly connected thereto and disposed within an aperture of approximately the same size in lever 410 in order that the lever and the hammer arm assembly will be effectively rigidly connected together. In this way, coil springs 418 tend to effect rotation of both assembly 413 and lever 410 in a clockwise direction, as viewed in FIGURE 15.

Figure 18A:
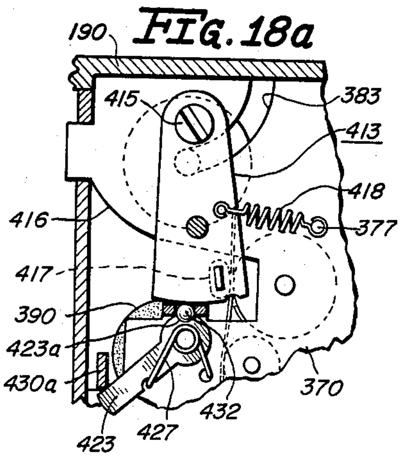

When slide 396 is raised by the action of opening door 206 to the position shown in FIGURE 14, lever 401 rocks around stud 402. One end 401*a* of the lever engages a tab of tape advance lever 410 and rotates that lever in a counter-clockwise direction (viewed in FIGURE 15) against the tension of springs 418. Since lever 410 and hammer arm assembly 413 are rigidly connected to each other, actuation of lever 410 effects displacement of assembly 413 to the position shown in FIGURE 18. In order to retain hammer arm assembly 413, and consequently printing platen 417 in the position shown in FIGURE 18, even after door 206 is closed, a novel cocking arrangement, shown primarily in FIGURES 18 and 18*a* is employed.

*Hammer Cocking Mechanism*

A latch element 423 is rotatably mounted to side plate 370. A wire spring 427 is hooked at one end in a notch of element 423 and at the other end in an aperture of side plate 370 in order to exert a clockwise torque, as viewed in FIGURE 18, on element 423. Latch 423 is prevented from rotating under the tension of spring 427, however, by an arm 430*a* of a print hammer trip lever 430 to be described. In the cocked position of bar 417 (FIGURE 18), a metallic bearing ball 432 is captivated between a conforming cutaway section of hammer arm assembly 413 and a portion of element 423. Bearing ball 432 effectively locks hammer arm assembly 413 in the position shown in FIGURE 18, irrespective of the position of door 206. As will be described, when it is desired to release printing platen 417, print hammer trip lever 430 is actuated such that portion 430*a* thereof moves in a downward direction in FIGURE 18 and assumes the position shown in FIGURE 18*a*. Such actuation of arm 430*a* effects counter-clockwise rotation of element 423 (viewed in FIGURES 18 and 18*a*), against the tension of spring 427 so that latch element 423 ends up in the position shown in FIGURE 18*a*. There, a notch or cutaway section 423*a* of element 423 lies below bearing ball 432, permitting the ball to drop. Lowering of ball 432 frees hammer arm assembly 413 so that it rotates in a counter-clockwise direction under the tension of coil springs 418. Platen bar 417 swings toward and strikes the portion of billing tape adjacent the print wheel assembly at the time.

Tape advance lever 410 has a position 410*a* (see FIGURES 14, 15 and 17) provided with a series of teeth for engaging a rubber roll 435 rotatably mounted on a bracket 436 rigidly mounted to plate 371. Rigidly connected to roll 435 is a gear 437 which meshes with a gear 438 coupled to rubber feed roll 390 by means of a one-way clutch spring 440. When gear 438 is driven in a counter-clockwise direction, as viewed in FIGURE 15, spring 440 tightens and drives rubber roller 390 also in a counter-clockwise direction. On the other hand, when gear 438 is driven in a clockwise direction, clutch spring 440 unwinds without causing any rotation of feed roll 390. A gear 442 is integral with gear 438 and meshes with a companion gear 443 rotatably mounted to plate 371. Another rubber roll 444 is rigidly connected to gear 443 between the gear and plate 371.

As tape advance lever 410 rocks in a counter-clockwise direction (as viewed in FIGURE 15) under the action of lever 401 as door 206 is opened, teeth 410*a* bear against rubber roll 335, causing rotation thereof in a clockwise direction. Since gear 437 turns with rubber roll 335, gear 438 rotates in a counter-clockwise direction and rotates rubber feed roll 390 in that direction. This action draws a single line portion of billing tape from spool 382 and pushes that amount into hopper 225. In this way, rotation of feed roll 390 in response to the opening of door 206 moves only that much of tape 384 past the raised type of print wheel 380 as is necessary so that the charges may be printed on separate but closely spaced lines.

Print solenoid 170 (see FIGURES 13 and 14) is mounted to back plate 231 and its plunger 170*a* engages one end of print hammer trip lever 430. The lever is rotatably mounted to back plate 231 by means of a stud 447. A coil spring 448 urges the end of lever 430 connected to plunger 170*a* in a direction away from solenoid 170, namely downwardly as viewed in FIGURE 13. In response to energization of print solenoid 170, plunger 170*a* is drawn upward, causing portion 430*a* of lever 430 to release latch element 423 so that it assumes the position shown in FIGURE 18*a*, causing actuation of printing platen bar 417, as previously described.

*Tape Hopper*

Hopper 225 is rotatably mounted to plates 370 and 371 by a pair of studs 451 and a pair of C-shaped snap washers. The hopper may be rotated by the subscriber from its accessible or open position shown in FIGURES 3, 14 and 15 to its closed position shown in FIGURES 11 and 16 wherein it is completely flush with escutcheon 191. Another tape advance lever 453 is rotatably mounted on the stud 451 visible in FIGURE 14. A coil spring 454 connects lever 453 to side plate 371 and urges lever 453 in a counter-clockwise direction as viewed in FIGURE 15. The lever has a tab portion 453*a* which is turned into the path of hopper 225 so that lever 453 rotates in a clockwise direction (viewed in FIGURE 15) as the hopper engages tab 453*a* when positioning it to its closed position as shown in FIGURE 16. Lever 453 also has a tab portion 453*b* containing a series of teeth which engage rubber roll 444, causing counter-clockwise rotation thereof (FIGURE 15), as the lever is pivoted in a clockwise direction against the tension of spring 454. However, counter-clockwise rotation of roll 444 and gear 443 causes clockwise rotation of gear 442 and due to the presence of one way clutch spring 440 such rotation of gear 442 effects no rotation of rubber feed roll 390.

Hopper 225 when positioned to its closed position by the subscriber, remains in that position by means of latch 458 having a hooked portion which catches a portion of the hopper 225. Latch 458 is rigidly connected to a shaft 459 which is journaled in side plate 371. The shaft makes a right angle turn to provide an upright portion (see FIGURE 14) which is connected to escutcheon 191 by means of a coil spring 460. Spring 460 tends to rotate the hook shaped portion of latch 458 in a counter-clockwise direction (viewed in FIGURE 15) to maintain hopper 225 in its closed position. It will be noted that in that position spring 454 is tensioned, thereby exerting a pressure on hopper 225 by means of tab 453*a* tending to spring hopper 225 to its open position.

Shaft 461 of push button 226 engages upright portion 459*a*. When the button is depressed by the subscriber against the tension of spring 460, upright 459*a* and latch 458 pivot in a clockwise direction as viewed in FIGURES 13 and 15. As soon as latch 458 releases hopper 225, spring 454 causes it to spring to the open position shown in FIGURE 15.

A movable knife blade 462 embraces and is rigidly connected to hopper 225. The knife is also rotatably mounted to side plates 370 and 371 by means of the two studs 451. When latch 458 is released and spring 454 springs the hopper to its open position, cutting blade 462 passes immediately adjacent fixed blade 393 cutting the billing tape at that point. If desired, cutting may also be achieved by the subscriber's pulling hopper 225 out to its open position subsequent to depressing button 226.

Pivoting of lever 453 in a counter-clockwise direction (viewed in FIGURE 15) as the hopper moves to its open position, causes the tab 453*b* to rotate rubber roll 444 in a clockwise direction which in turn results in counter-clockwise rotation of gear 442 which is the appropriate direction for effecting rotation of rubber feed roll 390. Because of the gear ratios employed, this results in the drawing of a relatively large amount, preferably several line portions, of tape from spool 382 and past print wheel assembly 380 into compartment 225. This amount is considerably greater than the amount of tape drawn past the print wheel assembly under the action of tab 410*a* of tape advance lever 410 when successive charges are made. As will be noted particularly in FIGURE 16, when hopper 225 is in its closed position, tape advance lever 453 leads cutting blade member 462; namely, lever 453 is closer to knife 393. Moreover, rubber feed roll 390 lies behind fixed cutting blade 393. With this arrangement, when latch 458 is released causing the hopper to spring to its open position under the action of spring 454, the teeth of portion 453*b* effect rotation of roll 390 to draw billing tape from spool 382 before cutting blades 462 and 393 pass each other, at which instant the billing tape is severed. In this way, all of the information printed on tape 384 until the time the hopper is sprung open will be included on that portion of the billing tape which is coiled inside compartment 225. The subscriber then merely removes the severed tape from the hopper to determine the number and amount of the charges assessed for any given period of time.

*Single Charge Register*

Figure 19:
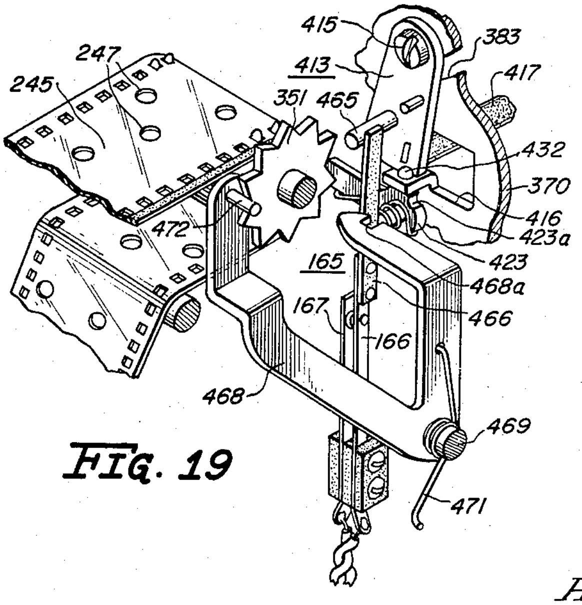

In order to make certain that only a single charge is registered in sound track 244 of film 245 and on billing tape 384 for any given program, actuation of print solenoid 170 effects opening of contacts 166 and 167 of switch 165 in the circuit diagram of FIGURE 2. In this way, both of the charge registers are effectively disabled against a repeat actuation to preclude duplicate charges for the same program. The mechanical arrangement for achieving such operation is shown in FIGURE 19. A stud 465 is rigidly connected at one end to print hammer arm assembly 413. The stud engages an extension 466, preferably constructed of some insulating material, of movable switch contact 166. Ordinarily, spring contacts 166 and 167 are biased to engage each other and establish an electrical connection therebetween. When print hammer arm member 413 is released by the action of trip lever 430, stud 465 moves toward and pushes extension 466 in the direction of front plate 230, opening contacts 166 and 167. A latching lever 468 is pivotally mounted by means of a stud 469 to front plate 230. The lever includes a notch 468*a* positioned to engage insulating member 466 once it is actuated by stud 465. A wire spring 471 is wrapped around stud 469 and has its two ends mounted to front plate 230 and lever 468 in order to bias the lever in the direction toward extension 466. In this way, there is assurance that once extension 466 is actuated in the direction of plate 230, notch 468*a* will immediately catch that extension, holding contacts 166 and 167 open even though stud 465 is subsequently moved to its cocked position by the action of opening door 206.

A stud 472, rigidly connected to a portion of lever 468, engages star wheel 351 when notch 468*a* retains contacts 166 and 167 open. When film 245 is moved, subsequent to displacement of extension 466 and opening of contacts 166 and 167, star wheel 351 rotates and cams stud 472 outwardly, thereby rocking lever 468 against the tension of spring 471 to the extent that notch 468*a* is moved out of engagement with extension 466. Contacts 166 and 167 close. Thus, once print solenoid 170 is actuated to register a charge for a program, it cannot be actuated again until film 245 has been repositioned as an incident to setting up the decoding apparatus for another subscription program. Lever 468 and extension 466 may therefore be thought of as means for disabling the charge registers against a repeat actuation to preclude duplicate charges for the same program, and star wheel 351 and stud 472 may be considered means responsive to subsequent readjustment of code-determining apparatus 60 for rendering disabling means 468, 466 ineffective in order to permit subsequent actuation of the charge registers.

*Door Lock Mechanism*

Figure 20:
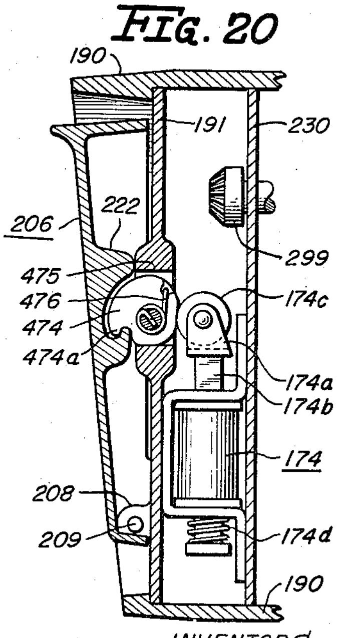

Attention is now directed to FIGURE 20 where the door latch mechanism which operates in response to door lock solenoid 174 is illustrated. The solenoid is rigidly mounted to front plate 230 and includes a U-shaped member 174*a* connected to its plunger 174*b*. A freely, rotatably mounted roller 174*c* is mounted within U-shaped member 174*a* and engages a latch element 474 mounted within an aperture 475 of escutcheon 191. Specifically, latch 474 is rotatably mounted within aperture 475 and by means of a wire spring 476, connected between the latch and escutcheon 191, the latch is urged to rotate in a clockwise direction. When door lock solenoid 174 is not energized, plunger 174*b* drops under the action of both gravity and a spring 174*d*, lowering roller 174*c* out of engagement with latch 474. The latch is therefore free to rotate in a clockwise direction approximately 90°, to the position shown in FIGURE 14, the shape of the latch and aperture 475 being such that rotation beyond that extent is prevented. The latch includes a hook portion 474*a* which engages a complementary hook portion of latch 222 provided in door 206. When door 206 is closed and solenoid 174 subsequently is actuated, roller 174*c* is actuated to the position shown in FIGURE 20, causing rotation of latch element 474 in a counterclockwise direction in order that the hook portion 474*a* engages and locks with latch 222. Door 206 cannot be opened, of course, until solenoid 174 de-energizes.

*Receiver Mechanical Operation*

Consideration will now be given to an explanation of the operation of the described receiver. It is contemplated that code-determining switching apparatus 60 will be adjusted differently for each different subscription program, and that the code combination, namely the number-letter combination that should appear in window 216 of the subscriber's decoding equipment, representing the adjustment of code-determining switching apparatus 60 for each program will be widely publicized, such as in program booklets, newspaper listings, etc. Advance wide scale publicity will also be given relative to the nature and cost for each program. The subscriber must then intially ascertain the particular code combination for a specified program in which he is interested. Assuming that the main television on-off switch is turned on, the subscriber then opens access door 206 to its open position. If the PV-TV switch has not already been placed in its PV position, the act of opening door 206 will do so, as has been explained.

Opening the access door also effects rocking of lever 401 with a consequent rotation of rubber feed roll 390 to cause billing tape 384 to be drawn from spool 382 so that a blank line portion of paper (approximately one-quarter inch of tape) is now immediately adjacent the single row of raised type of print wheel assembly 380 which bears against tape 384. In addition, rocking of lever 401 cocks print hammer arm assembly 413 to its position shown in FIGURE 18 in readiness for a subsequent printing operation. Since coil spring 418 is tensioned in the process of cocking hammer arm assembly 413, that spring effectively stores energy which is subsequently utilized for recording a charge.

Opening of access door 206 also results in (1) pivoting of interlock lever 332 to its position shown in FIGURE 11 so that stud 292 is free to occupy any position within slot 295; (2) rotation of cam 254 such that carriage 257 moves toward back plate 231 in order to free output contacts 265*a* from perforated tape or film 245; and (3) releasing detent lever 352 from engagement with star wheel 351 to permit rotation of sprocket 249. As previously explained, disconnection of the input and output contacts occurs before actuation of locking means 332 in order that adjustment of the code-determining apparatus is presented until after the disconnection to avoid possible damage to tape 245 and the output contacts. As a consequence, tape 245 may now be positioned.

Meanwhile, and referring particularly to FIGURE 2, A.C. voltage from source 125 is applied to the parallel combination of correlator lamp 141 and field coil 133 which combination is in series with coil 137 of buzzer 138. Neither the field coil nor the correlator lamp will energize with buzzer coil 137 in series therewith, although the buzzer itself energizes. This provides an audible indication to the subscriber that the code-determining apparatus has not been positioned to the correct adjustment. In addition, door switch 160 is actuated by opening door 206 so that movable contact 158 is brought into engagement with fixed contact 162 so that cyclometer pilot light 163 may be illuminated. This, of course, aids the subscriber in seeing the numbers and letters of cyclometer register 220, particularly when the decoding equipment is located in a semi-dark room. Lamp 163 has not been physically shown in the structural drawings in order not to obscure other elements. Of course, it may be mounted in a variety of different places to cast light on the exposed numbers and letters of window 216.

If the number-letter code combination representing the required adjustment of the code-determining apparatus for the program in question is lower than that already present in window 216, the subscriber rotates manual control knob 215 in a counter-clockwise direction, as viewed in FIGURE 5. This effects counter-clockwise rotation of relief clutch 274 and, because of its meshing engagement with pinion 281, counter-clockwise rotation of the pinion also. Of course, as viewed in FIGURE 7, pinion 281 would rotate clockwise. Consequently, clockwise rotation of idler gear 288 results (counter-clockwise in FIGURE 7). Because of the torque presented at the point where pinion 281 and gear 288 engage with respect to the axis of shaft 270, shifter arm 284 is rotated in a counter-clockwise direction from the position shown in FIGURE 5 to its limiting position determined by slot 295. Idler gear 288 engages gear 242, causing counter-clockwise rotation thereof, as viewed in FIGURE 5. Thus, rotation of knob 215 causes rotation of drive gear 242.

Spool 237 serves as a supply reel and spool 238 plays the role of a take-up reel, since tape 245 is pulled from spool 237 through matrix switch assembly 250 and is wound around reel 238 as gear 242 is rotated. The subscriber continues rotation of knob 215 until the appropriate number-letter combination is displayed within window 216. At that time, the selected pattern of perforations required to decode the selected program registers with the input and output contacts. Access door 206 may now be closed by the subscriber. Cam 254 resumes its position shown in FIGURE 12, causing carriage 257 to move toward plate 230 so that those output contacts 265*a* which are in registry with perforations 247 extend through those apertures to electrically connect, by means of the described wiping action, to their associated ones of input contacts 267*a* to establish an interconnection pattern between input conductors 51–56 and output conductors 61–65. Because of the described double wiping action and due to the fact that each one of the thirty bi-filar spring contacts 265*a* comprises two different parallel portions, the possibility of a faulty electrical connection is virtually eliminated.

If the number-letter code combination for a specified program is higher than that instantaneously displayed in the subscriber's window 216, he is obliged to turn knob 215 in a clockwise direction, which, in a manner similar to that described previously, causes shifter arm 284 to rotate in a clockwise direction (as viewed in FIGURE 5) such that idler gear 288 engages drive gear 241, as shown in FIGURE 7. Spool or reel 237, which is now the take-up reel, is actuated in order to draw film 245 through matrix switch assembly 250 and on to the spool.

Sprocket 249 in turn actuates cyclometer register 220 in a reverse direction until the correct code combination appears in window 216, at which time rotation of knob 215 is terminated. When door 206 is closed by the subscriber, the appropriate interconnection pattern between input circuits 51–56 and output circuits 61–65 is established.

The desirability of the arrangement of relief clutch 274 and pinion 281 stems from the possibility that a subscriber may inadvertently rotate knob 215 in either a clockwise or counter-clockwise direction even though all of tape 245 has been wound on one of the reels 237, 238. As mentioned previously, one end of tape 245 is anchored to spool 237 and the other end is anchored to spool 238. When all the tape is wound on either one of those two spools and the subscriber continues to rotate knob 215, the associated one of gears 241, 242 meshing with idler gear 288 at that time will offer substantial resistance to gear 288. Thus, gear 288 and pinion 281 become locked. Relief clutch 274, which rotates with knob 215, moves laterally to the right in FIGURE 6 against the tension of spring 279 inasmuch as pinion 281 is locked in position. The opposing faces of pinion 281 and clutch 274 therefore slip as they are now separated from each other. Knob 215 and clutch 274 may therefore be rotated indefinitely by the subscriber and yet pinion 281 will not be rotated and no damage will be inflicted on the switching apparatus. Thus, a torque limiting arrangement is provided so that when either extreme of film travel is reached, knob 215 will effectively slip rather than tear film 245 loose from either one of spools 237, 238.

Closing of access door 206 permits interlock lever 332 to pivot to the position shown in FIGURE 12 in order to lock stud 292 in its central position so that rotation of gears 241 and 242 is prevented. Additionally, closing of the access door permits detent lever 352 to pivot under the tension of spring 358 to the position shown in FIGURE 12 to detent the star wheel 351 thereby causing movement of tape 245 to the extent necessary in order to insure that the pattern of perforations presented to the input and output contacts is in precise registry with such contacts. As mentioned previously, detenting to the closest position of tape 245 occurs before the input and output contacts are engaged so that the tape may be zeroed-in unhampered by the contacts.

*Receiver Circuit Operation*

Assume now that code-determining switching apparatus 60 in the receiver has been properly set up for the program in question and its setting agrees with the corresponding switching apparatus in the transmitter of FIGURE 1. Decoding of the received television signal may take place. Specifically, the coded television signal is intercepted by antenna 91, amplified in the radio frequency amplifier in unit 90 and heterodyned to the selected intermediate frequency of the receiver in the first detector. The intermediate frequency signal is amplified in the intermediate frequency amplifier and detected in the second detector in unit 90 to produce a coded composite video signal which is translated through the cascade arrangement of first video amplifier 92, video decoder 95 and the second video amplifier 96 to the input electrodes of cathode-ray image reproducer 97 to control the intensity of the cathode ray beam thereof in conventional manner. Of course, this occurs only after filament 108 of second video amplifier 96 has been energized in a manner to be described. Video unscrambling occurs in complementary fashion to the video coding function in the transmitter and the input electrodes of picture tube 97 are supplied with completely unscrambled video information. The sweep systems in unit 99 are controlled in conventional manner by the synchronizing signal separator.

The inter-carrier sound signal is applied to unit 103 from the output of first video amplifier 92 wherein it is amplified, amplitude limited and demodulated to a scrambled audio signal which takes essentially the same form as that produced in the output of audio coder 78 in the transmitter. The scrambled audio signal is successfully unscrambled in audio decoder 104 by virtue of the fact that the components thereof are returned to their proper positions in the frequency spectrum, and the output of audio decoder 104 effectively constitutes a replica of the original uncoded sound signal. When filament 109 of the audio amplifier in unit 105 is energized, in a manner to be described, this replica is amplified and reproduced in the speaker of unit 105.

Monostable multivibrator 112 responds to field-drive pulses from unit 99 to produce gating pulses each having a duration sufficient to embrace the time interval in which the code and correlation signal components appear during each field-retrace interval, and those components are gated in by gate 113 for application to filter and rectifier units 49. Since code-determining switching apparatus 60 in the receiver is positioned in accordance with the same setting as the corresponding switching apparatus in the transmitter, units 25–73 operate in the same manner as described in connection with the identically numbered elements in the transmitter so that receiver decoding is in synchronism with transmitter coding. In this way, the rectangular shaped control signal developed in the output of multivibrator 26 and used for actuating video decoder 95 has a waveform identical to the waveform applied to video coder 11.

*Correlation Testing*

In order to perform a series of correlation tests to determine if the code-determining apparatus has, in fact, been properly positioned by the subscriber, a single correlation component of frequency $f_5$ occurs during each field-retrace interval and is channeled through apparatus 60 to gate 115 wherein it gates into normally-closed gate 116 the line-drive pulse occurring in coincidence therewith. As fully described in the copending Watters case Serial No. 26,545, when the receiver is appropriately adjusted the timing of the line-drive pulses selected by gate 115 are correlated with the output signal of multivibrator 26 such that the signal has a magnitude and polarity at the instants of the correlation pulses appropriate to turn gate 116 on and translate those line-drive pulses to correlator monostable multivibrator 120. Because of the normal cycling apparatus included in correlator monostable multivibrator 120, the multivibrator will always be established in its normal condition immediately prior to the arrival of the output pulses from gate 116. Consequently, each pulse from gate 116, and there will be only one per field-retrace interval, actuates correlator multivibrator 120 to its abnormal condition in which it remains until just prior to the next correlation test which occurs during the succeeding field-retrace interval.

Of course, if switching apparatus 60 is not adjusted in conformity to the adjustment at the transmitter, correlation pulses will not be translated through gate 116 to multivibrator 120 during each field-retrace interval, since multivibrator 26 has only a fifty-fifty chance of being in the appropriate condition at the occurrence of the correlation pulses. When properly correlated, however, multivibrator 120 is found in its abnormal condition, except for those brief intervals from the instants it returns to its normal condition to the succeeding correlation tests. As mentioned previously, correlator relay 122 remains continuously energized when the receiver is properly correlated.

In response to the initial energization of correlator relay 122, movable contact 151 actuates to establish an electrical connection with fixed contact 153 in order to apply ground to junction 154 of buzzer coil 137, correlator lamp 141 and field coil 133. The buzzer coil thus shorts out so that it no longer operates. Since buzzer coil 137 is no longer in series with the parallel combination of correlator lamp 141 and field coil 133, both of those elements are energized from source 125 via switch contacts 127 and 130 of PV-TV switch 128. Illumination of the correlator lamp provides a visual indication to the subscriber that his code-determining apparatus apparently has been properly set up.

Energization of field coil 133 initiates clockwise rotation of cam 148 of timing mechanism 135. As cam 148 leaves its starting position shown in FIGURE 2, contacts 145 and 146 immediately close. Preferably, these contacts should close within a half second of the initial rotation of cam 148. So long as correlator relay 122 remains energized during the progression of cam 148 during the testing interval, the closing of contacts 145 and 146 has no effect. However, it is desirable that any failure of a correlation test during the ten-second testing interval causes the return of timing mechanism 135 to its starting condition shown in FIGURE 2. The closing of contacts 145 and 146 for the lockout circuit insures that this will happen.

To elucidate, a mechanically driven timing mechanism, such as shown in the illustrated embodiment, usually requires an absence of energization for a minimum duration in order for the spring bias to fully return the mechanism to its starting condition. If it happens that code-determining switching apparatus 60 is incorrectly positioned but yet is so adjusted that most but not all of the input and output circuits are properly permuted, most of the correlation tests during a ten-second interval may prove successful, even though exact correlation does not prevail. In that event, the first failure during the test interval results in the absence of a pulse during a field-retrace interval at the output of gate 116, causing correlator monostable multivibrator 120 to fall back to its normal condition for at least the succeeding field-trace interval. Correlator relay 122 therefore de-energizes and movable contact 151 falls back to contact 152, removing ground from junction 154 and placing it on contacts 145 and 146. Buzzer 138 therefore energizes again, and correlator lamp 141 extinguishes, to provide the subscriber with an indication that correlation has been lost. Ground is now placed on input circuit 179 of bi-stable multivibrator 26 to actuate that multivibrator to its condition indicating incorrect correlation. In other words, an operating condition is imposed on the code-determining apparatus simulating miscorrelation. In this way, so long as ground is maintained on input 179, the output signal from multivibrator 26 can never assume the appropriate magnitude and polarity to gate a correlation pulse through gate 116 to multivibrator 120. As a consequence, correlator relay 122 will not again energize. The spring bias on timing mechanism 135 is thus permitted to return the mechanism all the way to its starting condition. This lockout arrangement consequently insures that any interruption of the energization of timing motor 135 during the ten-second timing cycle endures for at least the minimum duration required for the timing mechanism to return to its starting condition.

In the absence of this feature, it is possible that occasional correlation test failures would only result in arresting the progress of cam 148 or, alternatively, result in slipping back of cam 148 such that eventually the cam rotates or progresses to its final condition. Thus, it would be possible by an accumulation process, occurring during an interval longer than ten-seconds, for timer 135 to reach its final condition. As will be described presently, it is desired that the operations that take place after timing mechanism 135 reaches its final condition should not occur in a receiver which is not properly adjusted.

The spring bias included in timing mechanism 135 consequently constitutes a reset device tending to restore the mechanism to zero time register and requiring a predetermined restoring time to effect such restoration. Multivibrator 120, correlator relay 122 and contacts 151 and 152 may be thought of as means for interrupting timing mechanism 135 in response to the failure of a correlation test during the predetermined time interval tolled by the mechanism. The lockout circuit to input 179 of multivibrator 26 constitutes means, responsive to the interrupting means, for extending the interruption of the timing mechanism for an interval corresponding to the predetermined restoring time.

*Charge Recording*

Once again assuming that switching apparatus 60 is properly correlated with the adjustment of apparatus 60 in the transmitter, correlator relay 122 remains energized throughout the entire ten-second testing interval and in that period cam 148 progresses all the way to its final condition at which instant contacts 142, 143 and 144 are all brought together. At this time, ground on contact 142 is extended to terminal 172 to electrically connect each of print solenoid 170, erase head 171 and door lock solenoid 174 across the output terminals of A.C. voltage source 125. The high potential side of source 125 is connected to one side of door lock solenoid 174 merely by way of switch contacts 127 and 130 of PV-TV switch 128, whereas the high potential terminal is connected to one side of erase head 171 and print solenoid 170 via those same contacts of the PV-TV switch and also contacts 158 and 161 of door switch 160 and contacts 166 and 167 of switch 165.

The operation of print solenoid 170, in accordance with the present invention, actuates print hammer trip lever 430, causing printing platen bar 417 to release from its cocked position and strike that portion of billing tape 384 which is presented to the printing mechanism at the time, namely that portion which lies immediately adjacent the single line of type of print wheel assembly 380. That particular line of type is unique for the particular program under consideration as it not only effectively duplicates the number-letter combination shown in window 216 but in addition indicates a particular cost amount. Striking of printing platen 417 against the billing tape prints one line of information on the billing tape and records a charge. Since the setting of print wheel assembly 380 is determined by the setting of the cyclometer register 220 which in turn is determined by the particular pattern of perforations 247 presented to the input-output contacts, the charge register, namely print wheel assembly 380, printing platen 417, and the associated apparatus, records a charge in an amount dependent on the particular instantaneous position of the code-determining apparatus. Of course, while a charge is recorded in the illustrated embodiment (since it is a credit system), in a cash arrangement the charge register may be actuated to set up a cash or coin demand that must be met or acknowledged by the subscriber.

Energization of erase head 171 erases a small portion of the pre-recorded pattern on magnetic track 244 of film 245 to record a permanent and inaccessible record for internal auditing purposes. Erase head 171 thus constitutes means for recording the fact of correlation on strip 245. Of course, the particular position of the erased portion on track 244 is indicative of the particular pattern of perforations employed for a given program, which pattern is unique to that program. Thus, the operation of the subscription service may, by employing relatively simple sensing equipment, make a determination of the particular programs viewed by any given subscriber at any time. It is contemplated that only billing tape 384 will be needed for the collection of subscription charges, but if it is ever necessary to make a cross check between the charges recorded on billing tape 384, the internal audit provided by the erased portions of sound track 244 will serve that purpose.

As print hammer arm assembly 413 releases from its cocked position in the printing process, stud 465 (FIGURE 19) actuates extension 466, causing opening of contacts 166 and 167, which contacts will remain open by the action of latching lever 468. In this way, there will only be a single charge for each program even though the subscriber may turn his television set to a non-subscription program, such as a newscast, during a subscription broadcast, and then return to the subscription program. Of course, this may be done simply by turning the PV-TV switch knob 202 to the TV position. As soon as contacts 127 and 130 of PV-TV switch 128 are opened, field coil 133 for timing motor 135 de-energizes causing the timing mechanism to spring back to its starting condition. When the subscriber then turns back to the subscription program and turns the PV-TV switch 128 to its PV position, correlation testing is again resumed and after the ten-second timing cycle or test interval, the timing mechanism will once again assume its final condition at which instant ground is again placed on terminal 172 which, in the absence of opening contacts 166 and 167, would cause energization of print solenoid 170 and erase head 171. Of course, repeat energization of the erase head will not result in any additional erasing. However, energization of solenoid 170 would result in the printing of a duplicate charge on billing tape 384, if the subscriber also opened and then closed door 206 while the television set was turned to the non-subscription program resulting in the actuation of tape advance lever 410 and the presentation of a new and blank line portion of tape 384 to the printing mechanism.

Hence, print solenoid 170 may be thought of as means operable when timing mechanism 135 reaches its final condition for actuating the charge register, namely print wheel assembly 380 and its associated equipment. The apparatus shown in FIGURE 19 constitutes means for disabling the actuating means (print solenoid 170) subsequent to the actuation of the charge register to preclude duplicate charges for the same program in the event that there is a temporary de-energization of timing mechanism 135 during a subscription program, causing the timing mechanism to return to its starting condition from which it again progresses forward to its final condition. Stud 472 and star wheel 351 may then be considered means responsive to subsequent readjustment of code-determining apparatus 60 for rendering the disabling means (latching lever 468 and extension 466) ineffective in order to permit subsequent actuation of the charge register.

*Video and Audio Enabling*

The establishment of terminal 172 at ground at the termination of the ten-second testing interval in a properly correlated receiver also results in energization of filaments 108 and 109 of the vacuum tubes of the second video amplifier 96 and the audio amplifier portion of unit 105, respectively. Of course, the second video amplifier and the audio amplifier may be combined in a single twin tube, in which case only a single filament need be energized. In any event, when filaments 108 and 109 heat up in response to the potential form source 125, the decoded video signal is extended to picture tube 97 while the unscrambled audio signal is extended to the speaker of unit 105. Thus, both the video and audio signals are intelligibly reproduced. Filaments 108 and 109 may therefore be considered means operable when timing mechanism 135 reaches its final condition for intelligibly reproducing the intelligence signal, namely either the audio or video signal. Terminal 172 and the circuitry connected thereto may be though of as means, operable when timing mechanism 135 reaches its final condition, for producing a control effect indicating a correct correlation status between a given adjustment of apparatus 60 and its instantaneous adjustment.

*Timer Energization Hold*

It will be recalled that a special provision is made to insure that timing mechanism 135 returns to its starting condition if there is only a single correlation test failure during the ten-second testing interval to make certain that code-determining switching apparatus 60 is correctly adjusted to the prescribed setting for the program under consideration before charges are recorded and the video and audio signals are extended to the picture tube and speaker respectively. Of course, momentary interruptions of the code and correlation signal components as a result of transmitter error, impulse noise, air plane flutter, etc., occurring during the ten-second test interval also result in the de-energization of the correlator relay 122 with the consequent return of timing mechanism 135 to its starting condition even though switching apparatus 60 may be correctly positioned. Under such circumstances, the completion of the correlation testing procedure will be delayed slightly. For example, if air plane flutter results in de-energization of correlator relay 122 after only eight seconds of the testing interval, timing mechanism 135 returns to its starting condition so that another ten seconds is required before it may reach its final condition. Thus, eighteen seconds would be required to effectively perform a sufficient number of correlation tests to make a determination that the code-determining apparatus is correctly adjusted.

While such a loss of correlation is not objectionable during the correlating testing interval, it is desirable that any such loss should be avoided after the testing period has been completed, and the audio and video channels have been effectively rendered operable. Otherwise, video and sound may be momentarily lost with each correlation loss which, of course, is most undesirable. Accordingly, when timing mechanism 135 is established in its final condition, ground from contact 142 is extended to the lower terminal of condenser 178, which has a relatively large capacitance, so that it is in shunt with condenser 123. In this way, the time constant of correlator relay 122 is increased considerably in order that the relay may remain or be held in its energized condition even though correlator multivibrator 120 falls back to its normal condition and remains there for several field-trace intervals.

Thus, gates 115 and 116 and their associated circuitry provide testing means for conducting a series of correlation tests during the ten-second cycle tolled by time-delay means 135 to determine if code-determining apparatus 60 has been properly positioned. Means (multivibrator 120, relay 122, capacitor 123, and contacts 151 and 152) are coupled to testing means 115, 116 and perform one controlled function (de-energization of timer 135) in response to a negative result of any of the correlation tests during the ten-second cycle. Means (multivibrator 120, relay 122, capacitor 123, contacts 151 and 153, timer 135 and contacts 142–144) are also coupled to the testing means for performing another controlled function (turn video or audio on or record a charge) in response to a positive result of all of the tests in the series during the ten-second cycle. Condenser 178 along with multivibrator 120, relay 122, condenser 123 and contacts 151 and 152 perform the first-mentioned control function (de-energization of the timer) in response to a negative result of several consecutive correlation tests conducted after the series occurring during the ten-second timing cycle as a result of the increased time constant provided by capacitor 178.

In the event that switch contacts 166 and 167 do not open, for some reason or other, in response to the initial energization of solenoid 170, the current flowing through the solenoid also flows through slow-blow fuse 176, blowing the fuse after a predetermined delay interval, say several seconds. Since the fuse is in series with the energizing circuits for filaments 108 and 109, those filaments will now de-energize causing the video and audio channels to be inoperative. In the absence of this expedient, there is a remote possibility that the printing mechanism will not be actuated for each program to which the subscriber subscribes and thus there will be an inaccurate record of usage on the subscriber's billing tape. By effectively rendering the equipment inoperative by blowing of fuse 176, the subscriber is required to call the subscription service operator in order that the malfunction may be remedied.

Of course, at the end of each subscription television program the receiver no longer receives the code and correlation signal components so that multivibrator 120 falls back to its normal condition wherein it will remain. The consequent de-energization of relay 122 results in the removal of ground from terminal 154 causing the timing mechanism to return to its starting condition. Buzzer 138 now operates indicating to the subscriber that he should turn his PV-TV switch 128 to the TV position. By so doing, all of the decoding circuitry is turned off and the receiver is converted to one of conventional non-subscription variety. From time to time, for example once every month, it is contemplated that each subscriber will be requested to pay the charges that have accumulated. He will then open door 206 and depress push button 226, causing compartment 225 to spring out. This results in two different operations. Initially, rubber feed roll 390 is rotated to draw a substantial quantity of tape 384 (for example 1½ inches) from spool 382. Knife blade 462 subsequently passes cutter 393 effecting severing of billing tape 384 at that point. The section of tape 384 which has been separated is retained in hopper 225. Since the hopper is now in its open position, this section of tape, which will include a series of printed charges, is readily accessible to the subscriber.

The subscriber will be instructed to ascertain the total cost of all of the individual programs which he has viewed by adding up the charges on the separated section of the billing tape. He may then mail in a remittance to the subscription service organization, pay the bill at a currency exchange, etc. Alternatively, he may merely forward the separated tape to the subscription service operator at which the charges may be totaled and a bill in the amount of the total mailed back to the subscriber. To identify the subscriber and to insure that all billing tape is returned, the paper tape stock may have printed on the reverse side two items: (1) a serial number repeated at closely spaced intervals and assigned to the particular decoding equipment in which the billing tape is installed; and (2) closely spaced numbers in a continuous series so chosen that in auditing returned tape the absence of a portion of the tape will easily be detected. In addition, it is contemplated that the billing tape will have printed thereon a colored stripe near the end as an indication that the decoder is almost out of tape.

*Summary*

To summarize the invention to which the present application is directed, a subscriber communication receiver, specifically a subscription television receiver, is provided for utilizing a received intelligence (for example video) signal. Switching apparatus 60 constitutes a code-determining apparatus which must be adjusted by the subscriber in accordance with a given adjustment for a specified program before the intelligence signal for that program may be intelligibly reproduced. Print wheel assembly 380, platen bar 417 and its actuating apparatus primarily constitute a printing mechanism. Tape 384 provides billing tape on which charge information is to be recorded, a portion of which tape is presented to the printing mechanism. In other words, at any given time only one line portion of tape 384 is presented to the type of print wheel assembly 380. Rubber roll 390 and its actuating apparatus provide means for changing the portion of billing tape 384 which is presented to the printing mechanism. The circuitry shown in FIGURE 2 along with the printing mechanism may be considered means for recording a charge for the specified program on that portion of the billing tape instantaneously presented to the printing mechanism if code-determining apparatus 60 has in fact been properly positioned to the given adjustment.

Of course, while the communication receiver of the invention has been shown in the environment of a subscription television receiver of the type wherein the received intelligence signal is coded or scrambled, the invention is certainly not so restricted. It is not necessary that decoding apparatus be provided nor a coded intelligence signal be present. For example, the invention may be applied to a communication receiver wherein the television signal is conveyed in conventional, uncoded form via a coaxial cable or other closed circuit. A simple gate circuit, blocking device, or disabling means of any kind may be interposed in the receiver prior to the picture tube and/or speaker in order to prevent intelligible reproduction until the code-determining apparatus has been properly set up.

Certain features described in the present application are disclosed and claimed in copending application Serial No. 117,431, filed June 15, 1961, in the name of Melvin C. Hendrickson et al., and also in the following copending applications filed concurrently herewith: Serial Nos. 169,812, in the name of George V. Morris; 169,791, in the name of Melvin C. Hendrickson et al.; 169,766, in the name of George V. Morris et al.; 169,762, in the name of Louis Terek; 169,806, in the name of Pentti Sarlund; and 169,792, in the name of Emil C. Walker, all of which are assigned to the present assignee.

While particular embodiments of the invention have been shown and described, modifications may be made and it is intended in the appended claims to cover all such modifications as may fall within the true spirit and scope of the invention.

We claim:

1. A subscriber communication receiver for utilizing a received intelligence signal comprising:

code-determining apparatus which must be adjusted by the subscriber in accordance with a given adjustment for a specified program before said intelligence signal may be intelligibly reproduced;

a movable mechanism, coupled to said code-determining apparatus, to be moved by the subscriber between first and second positions and which must be established in said second position before said code-determining apparatus may be adjusted;

a printing mechanism;

billing tape on which charge information is to be recorded, a portion of which tape is presented to said printing mechanism;

means coupled to said movable mechanism and responsive to movement thereof from said first to said second position for changing the portion of said billing tape which is presented to said printing mechanism;

means coupled to said movable mechanism and also responsive to movement thereof from said first to said second position for storing energy;

and means including said printing mechanism for subsequently utilizing the stored energy to record a charge for said program on that portion of said billing tape instantaneously presented to said printing mechanism;

2. A subscriber communication receiver for utilizing a received intelligence signal comprising:

code-determining apparatus which must be adjusted by the subscriber in accordance with a given adjustment for a specified program before said intelligence signal may be intelligibly reproduced;

means for deriving a comparison signal from said code-determining apparatus having a characteristic determined, at least in part, by the instantaneous adjustment of said code-determining apparatus;

correlation testing means responsive to said comparison signal for effectively comparing the instantaneous adjustment of said code-determining apparatus with said given adjustment to derive a control effect only if said code-determining apparatus has in fact been properly positioned to said given adjustment;

a printing mechanism;

billing tape on which charge information is to be recorded, a portion of which tape is presented to said printing mechanism;

means for changing the portion of said billing tape which is presented to said printing mechanism;

and means, including said printing mechanism, coupled to said correlation testing means and responsive to said control effect for recording a charge for said specified program on that portion of said billing tape instantaneously presented to said printing mechanism.

3. A subscriber communication receiver for utilizing a received intelligence signal comprising:

code-determining apparatus which must be adjusted by the subscriber in accordance with a given adjustment for a specified program before said intelligence signal may be intelligibly reproduced;

means for deriving a comparison signal from said code-determining apparatus having a characteristic determined at least in part, by the instantaneous adjustment of said code-determining apparatus;

correlation testing means responsive to said comparison signal for effectively comparing the instantaneous adjustment of said code-determining apparatus;

correlation testing means responsive to said comparison signal for effectively comparing the instantaneous adjustment of said code-determining apparatus with said given adjustment to derive a control effect only if said code-determining apparatus has in fact been properly positioned to said given adjustment;

a movable mechanism to be moved by the subscriber between first and second positions;

a printing mechanism;

billing tape on which charge information is to be recorded, a portion of which tape is presented to said printing mechanism;

means coupled to said movable mechanism and responsive to movement thereof from said first to said second position for changing the portion of said billing tape which is presented to said billing mechanism;

and means, including said printing mechanism, coupled to said correlation testing means and responsive to said control effect for recording a charge for said specified program on that portion of said billing tape instantaneously presented to said printing mechanism.

4. A subscriber communication receiver for utilizing a received intelligence signal for each program, and wherein different charges may be assessed for different programs, comprising:

code-determining apparatus which must be adjusted by the subscriber in accordance with a given and different adjustment for each program before said intelligence signal may be intelligibly reproduced;

means for deriving a comparison signal from said code-determining apparatus having a characteristic determined, at least in part, by the instantaneous adjustment of said code-determining apparatus;

correlation testing means responsive to said comparison signal for effectively comparing the instantaneous adjustment of said code-determining apparatus with said given adjustment to derive a control effect only if said code-determining apparatus has in fact been properly positioned to said given adjustment;

a movable mechanism to be moved by the subscriber between first and second positions;

a printing mechanism;

a roll of billing tape on which charge information is to be recorded and effectively divided into a multiplicity of adjacent line portions only one of which is initially presented to said printing mechanism and on each of which charge information for a different program may be registered;

means coupled to said movable mechanism and responsive to movement thereof from said first to said second position for drawing said billing tape from said roll to present the immediately adjacent line portion to said printing mechanism;
means, including said printing mechanism, coupled to said correlation testing means and responsive to said control effect for recording a charge on that line portion of said billing tape instantaneously presented to said printing mechanism;
and means for drawing several line portions of said tape from said roll in order that all of said billing tape containing recorded charges may be removed by the subscriber.

5. A subscriber communication receiver for utilizing a received intelligence signal for each program, and wherein different charges may be assessed for different programs, comprising:
code-determining apparatus which must be adjusted by the subscriber in accordance with a given and different adjustment for each program before said intelligence signal may be intelligibly reproduced;
means for deriving a comparison signal from said code-determining apparatus having a characteristic determined, at least in part, by the instantaneous adjustment of said code-determining apparatus;
correlation testing means responsive to said comparison signal for effectively comparing the instantaneous adjustment of said code-determining apparatus with said given adjustment to derive a control effect only if said code-determining apparatus has in fact been properly positioned to said given adjustment;
a movable mechanism to be moved by the subscriber between first and second positions;
a printing mechanism;
a roll of billing tape on which charge information is to be recorded and effectively divided into a multiplicity of adjacent line portions only one of which is initially presented to said printing mechanism and on each of which charge information for a different program may be registered;
means coupled to said movable mechanism and responsive to movement thereof from said first to said second position for drawing said billing tape from said roll to present the immediately adjacent line portion to said printing mechanism;
means, including said printing mechanism, coupled to said correlation testing means and responsive to said control effect for recording a charge on that line portion of said billing tape instantaneously presented to said printing mechanism;
a compartment, accessible to the subscriber, for receiving that part of said billing tape on which charges have been recorded;
and means for drawing several line portions of said tape from said roll so that all of said billing tape containing recorded charges may be moved from said printing mechanism and into said compartment.

6. A subscriber communication receiver for utilizing a received intelligence signal for each program, and wherein different charges may be assessed for different programs, comprising:
code-determining apparatus having an adjustable control which must be adjusted by the subscriber in accordance with a given and different adjustment for each program before said intelligence signal may be intelligibly reproduced;
means for deriving a comparison signal from said code-determining apparatus having a characteristic determined, at least in part by the instantaneous adjustment of said code-determining apparatus;
correlation testing means responsive to said comparison signal for effectively comparing the instantaneous adjustment of said code-determining apparatus with said given adjustment to derive a control effect only if said code-determining apparatus has in fact been properly positioned to said given adjustment;
a movable access door to be moved by the subscriber between an open position, in which said adjustable control is accessible to the subscriber, and a closed position in which said control is covered and is inaccessible to the subscriber;
a printing mechanism;
a roll of billing tape on which charge information is to be recorded for each program and effectively divided into a multiplicity of adjacent line portions only one of which is initially presented to said printing mechanism and on each of which charge information for a different program may be registered;
means coupled to said movable access door and responsive to movement thereof from said closed to said open position for drawing said billing tape from said roll to present the immediately adjacent line portion to said printing mechanism;
means, including said printing mechanism, coupled to said correlation testing means and responsive to said control effect for recording a charge on that line portion of said billing tape instantaneously presented to said printing mechanism;
a compartment, accessible to the subscriber, for receiving that part of said billing tape on which charges have been recorded;
means for drawing several line portions of said tape from said roll so that all of said billing tape containing recorded charges may be moved from said printing mechanism and into said compartment;
and means for severing that part of said billing tape contained in said compartment from the remainder of said billing tape in order that the separated tape may be removed from the compartment by the subscriber to serve as a bill.

References Cited in the file of this patent

UNITED STATES PATENTS

| | | |
|---|---|---|
| 2,769,023 | Loew et al. | Oct. 30, 1956 |
| 2,866,962 | Ellett | Dec. 30, 1958 |
| 2,875,270 | Wendt et al. | Feb. 24, 1959 |
| 2,909,592 | Morris et al. | Oct. 20, 1959 |
| 2,918,522 | Ridenour | Dec. 22, 1959 |
| 3,051,775 | Novak et al. | Aug. 28, 1962 |